(12) United States Patent
Howe et al.

(10) Patent No.: US 8,318,853 B2
(45) Date of Patent: Nov. 27, 2012

(54) THERMALLY-RESPONSIVE DISPERSANTS FOR MEDIA FORMULATIONS

(75) Inventors: Andrew M. Howe, Chesterton (GB); Trevor J. Wear, Ely (GB); Alan R. Pitt, Sandridge St Albans (GB); Ian M. Newington, High Wycombe (GB); John H. Hone, Chalfont St. Peter Gerrards Cross (GB)

(73) Assignee: Eastman Kodak Company, Rochester, NY (US)

( * ) Notice: Subject to any disclaimer, the term of this patent is extended or adjusted under 35 U.S.C. 154(b) by 349 days.

(21) Appl. No.: 12/665,040

(22) PCT Filed: Jun. 19, 2008

(86) PCT No.: PCT/GB2008/002106
§ 371 (c)(1),
(2), (4) Date: Dec. 17, 2009

(87) PCT Pub. No.: WO2009/001045
PCT Pub. Date: Dec. 31, 2008

(65) Prior Publication Data
US 2010/0184910 A1   Jul. 22, 2010

(30) Foreign Application Priority Data
Jun. 27, 2007   (GB) .................................... 0712482.9

(51) Int. Cl.
*C08L 39/00* (2006.01)
*B05D 3/02* (2006.01)
*B41J 2/15* (2006.01)
(52) U.S. Cl. ............................ 524/555; 427/384; 347/20
(58) Field of Classification Search .................. 524/555; 427/384; 347/20
See application file for complete search history.

(56) References Cited

U.S. PATENT DOCUMENTS
7,316,816 B2 *   1/2008   Yang et al. ..................... 424/427
(Continued)

FOREIGN PATENT DOCUMENTS
EP   0 161 104   11/1985
(Continued)

OTHER PUBLICATIONS

Shin et al, Journal of Applied Polymer Science (1997), 65(4), pp. 685-693, "Indomethacin Release Behaviors from pH and Thermoresponsive Poly (vinyl alcohol) and Poly (acrylic acid) IPN Hydrogels for Site-Specific Drug Delivery."

(Continued)

*Primary Examiner* — Michael M Bernshteyn
(74) *Attorney, Agent, or Firm* — Andrew J. Anderson

(57) ABSTRACT

A thermally-responsive dispersant for an aqueous dispersion of positively- or negatively-charged or chargeable solid or liquid particulates, comprises a compound having an anchoring moiety linked to a thermally-responsive polymeric stabilizing moiety, other than a polyalkylene oxide, the polymeric moiety having a lower affinity for the surface than the anchoring group below the thermal transition temperature, the particulates being positively-charged or chargeable when the anchoring moiety contains an acid and/or hydroxy group and has a net acidity or neutrality and the particulates being negatively-charged or chargeable when the anchoring moiety has a basic group and has a net basicity, wherein the dispersion exhibits a change in sign from negative to positive and an increase in magnitude of a rheological property (viscosity at low shear and/or complex modulus at low amplitude oscillatory shear), on increasing the temperature from below to above the thermal transition temperature.

17 Claims, 8 Drawing Sheets

U.S. PATENT DOCUMENTS

2006/0235176 A1* 10/2006 Lee et al. .................. 526/264

FOREIGN PATENT DOCUMENTS

| WO | WO 98/56733 | | 12/1998 |
|---|---|---|---|
| WO | WO 01/05844 | | 1/2001 |
| WO | WO 03/004767 | | 1/2003 |
| WO | WO 2005/121196 | | 12/2005 |
| WO | WO 2005121196 A1 | * | 12/2005 |
| WO | WO 2006/067453 | | 6/2006 |
| WO | WO 2006/067457 | | 6/2006 |
| WO | WO 2006067453 A1 | * | 6/2006 |
| WO | WO 2006067457 A1 | * | 6/2006 |
| WO | WO 2007/071960 | | 6/2007 |

OTHER PUBLICATIONS

Cammas et al., Journal of Controlled Release (1997), 48(2,3), pp. 157-164, "Thermo-responsive polymer nanoparticles with a core-shell micelle structure as site-specific drug carriers."

Yang et al. Formulation, Characterization, and Antibacterial Drug Delivery in Pharmaceutical Research (2006), 23 (1), pp. 205-214, "Thermoresponsive Gelatin/Monomethoxy Poly(Ethylene Glycol)-Poly(D,L-lactide) Hydrogels: Formulation, Characterization, and Antibacterial Drug Delivery."

Kharlampieva et al., Macromolecules (2005), 38(25), pp. 10523-10531, "Hydrogen-Bonded Multilayers of Thermoresponsive Polymers."

Kikuchi, et al., Macromolecular Symposia, Fundamentals and Applications of Polymer Gels in Macromolecules, (2004) 207, pp. 217-227, "Temperature-Responsive, Polymer-Modified Surfaces for Green Chromatography."

Iyer, et al. "Synthesis and swelling behaviour of hydrophobically modified responsive polymers in dilute aqueous solutions" Polymer, Elsevier Science Publishers B.V. GB., vol. 46, No. 26, Dec. 12, 2005, pp. 12190-12199.

* cited by examiner

THERMALLY-RESPONSIVE DISPERSANTS FOR MEDIA FORMULATIONS

CROSS-REFERENCE TO RELATED APPLICATIONS

This application is related to WO 2006/067453, WO 2006/067457 and WO 2007/071960.

FIELD OF THE INVENTION

The invention relates to the combination of an efficient thermally-responsive dispersant and an aqueous dispersion of positively- or negatively-charged or chargeable solid or liquid particulates, such that the resulting disperse system exhibits a relatively low viscosity below the transition temperature of the dispersant, but a relatively high viscosity or elastic behaviour above this temperature. The particulate dispersion may be used, for example, as a component of a coating material, an inkjet ink, an inkjet recording paper or film, a chemical-mechanical polishing/abrasive material, a ceramic, a cement, a paint, a catalyst system, a refractory material, a surface-frictionising formulation, a filler or any product that incorporates colloidal materials.

BACKGROUND OF THE INVENTION

Manufacturing formulations involving aqueous dispersions of solid or liquid particulates often require to be processed at a high concentration for one or more of the following reasons: to improve the costs/efficiency of transportation, to increase laydown or to reduce the drying load, as the removal of water is wasteful and expensive. The formulations also need to be stable over a wide range of conditions. After mixing, aqueous dispersions of particulates, especially those containing high concentrations of solid, tend to form a system that is either highly viscous or behaves as a 'yield stress material' such as a gel, especially at low shear. The high viscosity or gel-like nature of such dispersions at low shear affects their dispersability and flowability, making the systems difficult to stir, pump, transport, coat or pour.

At first it is useful to reduce the viscosity of such dispersions to aid their initial processing and manipulation, for example in a coating, pumping or pouring process. Having attained the required geometry the next process is often one of drying where the objective is to 'fix' or 'set' the system in a solid state. The normal objective here is to maintain the uniformity attained at the completion of the manipulation stage (e.g. coating or pouring). Drying processes usually involve the application of heat and currents of air (and sometimes the control of humidity in aqueous systems). Air currents and machinery vibrations can perturb the uniformity of such systems, which is undesirable. Unfortunately dispersants used to reduce the viscosity of formulations to aid the wet processing of a product usually cause the formulation to decrease further in viscosity with increasing temperature, which makes the product more prone to perturbations until evaporative losses reverse this process and cause the viscosity to rise.

Thermally-responsive polymers, in which the solubility is dependent on temperature, are well known, the most common being those based on poly-ethyleneoxide (also known as PEO, polyethyleneglycol or PEG), poly(N-isopropyl-acrylamide) (also known as, and hereinafter identified as, poly-NIPAM) and poly-(N-vinylcaprolactam) (also known as PNVCap or PVCL). Polymers that exhibit a lower consulate solution temperature (LCST) or volume phase transition temperature (VPTT) would provide suitable materials to give thermally-responsive dispersants.

By far the most common application of these systems appears to be in the formation of hydrogels for controlled drug delivery. Thus Shin et al. in Journal of Applied Polymer Science (1997), 65(4), 685-693 disclose "Indomethacin-release behaviour from pH and thermo-responsive poly(vinyl alcohol) and poly(acrylic acid) interpenetrating network hydrogel for site-specific drug delivery". Cammas et al. in Journal of Controlled Release (1997), 48(2, 3), 157-164 describe "Thermo-responsive polymer nanoparticles having a core-shell micelle structure as site-specific drug carriers". Yang et al. describe "Thermoresponsive Gelatin/Monomethoxy Poly(Ethylene Glycol)-Poly(D,L-lactide) Hydrogels: Formulation, Characterization, and Antibacterial Drug Delivery"in Pharmaceutical Research (2006), 23(1), 205-214 and Kharlampieva et al. disclose "Hydrogen-Bonded Multilayers of Thermo-responsive Polymers" in Macromolecules (2005), 38(25), 10523-10531.

Another biochemical application of thermally-responsive polymers is in bio-separation processes wherein thermally-responsive hydrophobic chromatography can be utilised by using thermal gradients, as described by Kikuchi et al. in "Temperature-Responsive, Polymer-Modified Surfaces for Green Chromatography, "Macromol. Symp., (2004), 207, 217-227. A further application for thermally-responsive polymer is in the cosmetics field.

However, examples of thermally-responsive, (also known as "thermo-responsive", "temperature-dependent" or "thermally-switchable") dispersants for positively- or negatively-charged or chargeable particles (for example inorganic oxides/hydroxides) in aqueous media are less well known.

WO 2003/004767 describes an aqueous slurry or dispersion of pigment particles comprising as dispersant an amphiphilic polymer at least partly adsorbed to the pigment particles, wherein the slurry or dispersion exhibits a temperature-dependent viscosity, such that the viscosity increases by a factor of at least about two when the temperature is raised from about 20° C. to about 100° C.

WO 98/56733 describes a method for manufacturing moulded ceramic and metallic products and crystallographically oriented anisotropic products from powders and powder dispersions in aqueous media, wherein the temperature of the fluid dispersion solids of high solids content is raised once it has been manipulated into its final shape. The surface of the particles is coated with a dispersant having a temperature-dependent solubility in the aqueous medium by the use of a dispersant comprising anchor and stabilising groups. The anchor group(s), which is preferably a silane group, anchors the dispersant to the surface and the stabilising groups, which are alkyleneoxides, are temperature-sensitive to the solvent medium. At low temperature the stabilising groups are solvated and the particles are spaced apart, whereas at higher temperatures the alkyleneoxides groups de-solvate and contract, leading to aggregation of the particles due to attractive forces.

WO 2006/067453 and WO 2006/067457 describe the use of an anchored stabilizer-form of dispersant for an aqueous composition (or dispersion) of positively-charged or chargeable solid particulates. However, they do not suggest the use of thermally-responsive polymers for the stabilizer part of the anchored dispersant. WO 2006/067457 teaches by way of comparative examples that the use of poly-ethoxylated blocks in the stabilizer/buoy part of a potential anchor-buoy form of dispersant is not suitable for dispersing an aluminium oxide dispersion at ambient temperatures.

WO 2007/071960 describes the use of an anchored stabilizer form of dispersant for an aqueous composition (or dispersion) of negatively-charged or chargeable solid particulates. However again there is no suggestion of the use of thermally-responsive polymers for the stabilizer part of the anchored dispersant.

Thus existing prior art thermally-responsive dispersants are
(a) thermally-responsive polymers/copolymers that are not designed with a terminal-anchoring group;
(b) anchored stabilisers with a terminal anchoring group and a stabilising group based on a thermally-responsive polymer polyalkyleneoxide; or
(c) anchored polymeric stabilisers with anchor groups based on an acid/OH or basic group wherein the polymeric stabiliser is not a thermally-responsive entity.

Owing to the above limitations, existing prior art materials are either ineffective or show limited efficiency/effectiveness as thermally-responsive dispersants, particularly for dispersions containing colloids with positively- or negatively-charged or chargeable oxide/hydroxide surfaces.

PROBLEM TO BE SOLVED BY THE INVENTION

There is a need for efficient thermally-responsive dispersant additives for aqueous compositions (or dispersions) of positively- or negatively-charged or chargeable solid or liquid particulates, especially at high concentrations, that can provide a low viscosity dispersion at low temperatures, thereby facilitating handling and processing, and a high viscosity dispersion at higher temperatures, so that the system can be immobilised by heating once it has been manipulated into its final desired geometry/form. This set of conditions would facilitate the fixing or setting the system on raising the temperature by limiting the tendency of the system to flow and increasing the resistance of the system to deformation from external perturbations. Thus if the viscosity of the dispersion systems could be increased dramatically on raising temperature then the tendency of the system to flow could be reduced and the resistance of the system to deformation from external perturbations such as air currents or vibrations could be increased.

It has now been found that these problems can be overcome by the use in an aqueous composition of a dispersant having a thermally-responsive character and a structure such that the dispersant is solvated below a specific temperature range and mostly de-solvated above this range. Thus all solution processing and manipulation operations (e.g. such as coating) can be carried out below the transition temperature of the dispersant wherein the dispersant is solvated and can act as a good dispersing aid thus keeping the formulation fluid, whilst on increasing the temperature above the temperature transition point of the dispersant at the drying stage, the dispersant is largely desolvated, leading to aggregation of the dispersion and a significant rise in the system viscosity.

SUMMARY OF THE INVENTION

The present invention thus provides a thermally-responsive dispersant for an aqueous dispersion of positively- or negatively-charged or chargeable solid or liquid particulates which comprises a compound having an anchoring moiety linked to at least one thermally-responsive polymeric stabilising moiety, other than a polyalkylene oxide, the at least one polymeric moiety having a lower affinity for the surface than the anchoring group below the thermal transition temperature, the particulates being positively-charged or chargeable when the anchoring moiety contains at least one acid and/or hydroxy group and has a net acidity or neutrality and the particulates being negatively-charged or chargeable when the anchoring moiety has at least one basic group and a net basicity, wherein the dispersion exhibits a change in sign from negative to positive and an increase in magnitude of a rheological property, the property being viscosity at low shear and/or complex modulus at low amplitude oscillatory shear, on increasing the temperature from below to above the thermal transition temperature.

In another aspect there is provided a coating composition containing positively- or negatively-charged or chargeable solid or liquid particulates, the composition comprising one or more dispersants, as hereinbefore defined, in association with an aqueous dispersing medium, and optionally a binder.

In yet another aspect there is provided a method of coating a substrate comprising the steps of
(a) providing a composition of positively- or negatively-charged or chargeable solid or liquid particulates;
(b) combining the composition with one or more dispersants, as hereinbefore defined, in association with an aqueous dispersing medium, and optionally a binder, to form a coating composition;
(c) applying the coating composition to the substrate at a temperature below the thermal transition temperature of the dispersant to form a fluid coating thereon; and
(d) drying the resultant coating at a temperature above the transition temperature of the dispersant by the application of heat.

In a further aspect there is provided the use of a thermally-responsive dispersant for the preparation of a coating composition, as hereinbefore defined, to increase the porosity of the coated composition by the rapid application of heat following coating.

In yet a further aspect there is provided an inkjet recording element comprising a support having thereon at least one image-receiving layer, the inkjet recording element containing a coating composition as hereinbefore defined.

In an additional aspect there is provided the use of a coating composition, as hereinbefore defined, in the preparation of an inkjet recording element, the recording element being capable of providing an image of improved quality following printing with an inkjet ink composition.

ADVANTAGEOUS EFFECT OF THE INVENTION

This invention provides an efficient thermally-responsive dispersant for an aqueous dispersion of positively- or negatively-charged or chargeable solid or liquid particulates that reduces the viscosity of the dispersion when used below its thermal transition temperature. Thus at low temperatures the dispersant facilitates manipulations such as pouring, stirring, pumping, transporting and coating of the resulting dispersion due to improved dispersability and flowability. Once the dispersion has been manipulated into its final desired geometry, e.g. a coating, the thermally-responsive nature of the dispersant allows it to be to be destabilised by the application of sufficient heat to take the dispersant above its transition temperature, resulting in a significant increase in viscosity or the transition from viscous to elastic behaviour. The setting/fixation of the final geometry of the dispersion is thereby facilitated, such that the uniformity of the geometry is maintained, whereby the resulting dispersions are not adversely affected by air currents and general machinery vibrations.

Furthermore, the effect of the presence of the dispersant in an inkjet recording element is to give rise to improved quality of a printed image as a result of reduction in the defect known as coalescence or mottle. A reduction in coalescence can arise as a result of a more rapid uptake of the ink into the element.

DETAILED DESCRIPTION OF THE INVENTION

Figure 1:
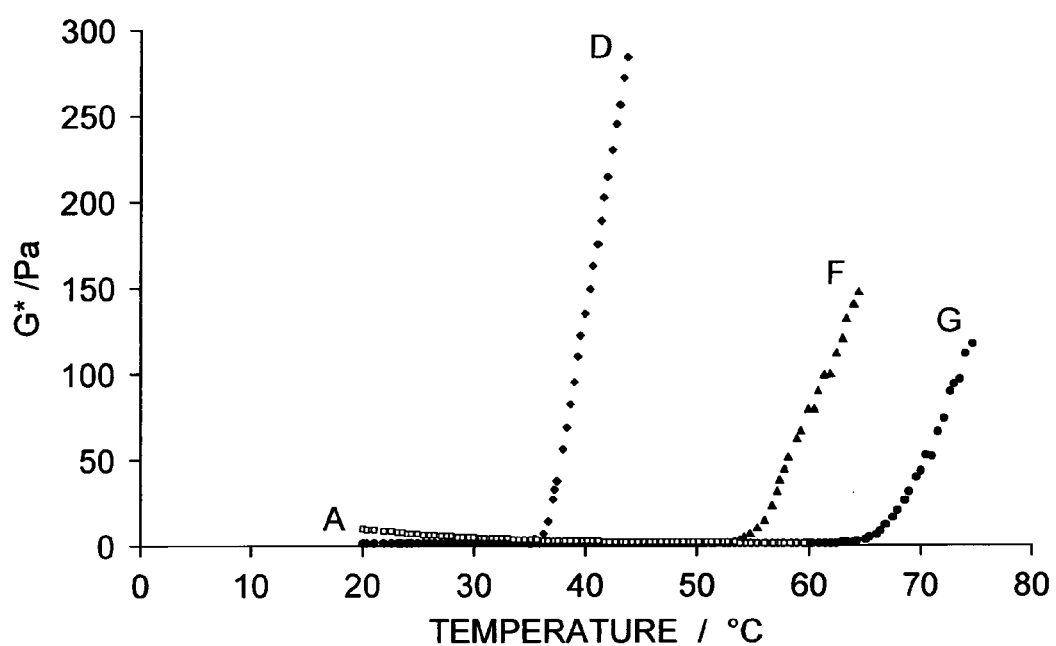
FIG. 1 is a plot of complex modulus (linear scale) against temperature for Control 1 with no thermal transition (Curve A), Control+dispersant I-1a (Curve D), Control+dispersant I-5a (Curve F) and Control+dispersant I-6a (Curve G).

Aqueous dispersions of positively- or negatively-charged or chargeable solid or liquid particulates, and their resulting compositions, tend to exhibit increasingly high viscosity especially at high concentrations of particulates. It is known in the art that the viscosity of these systems can be reduced by the addition of a dispersant comprising a compound having a suitable anchoring moiety linked to a polymeric stabilising moiety. A liquid-based dispersion of liquid particulates is an emulsion and such liquid particulates may be solidified, for example by their polymerisation or following a phase transition. However, the main focus of the invention is dispersions of solid particulates.

Once the dispersion or composition has been manipulated into its final desired geometry, e.g. a coating, it is desirable to dry, set and fix the system without adversely affecting the uniformity of the geometry attained. The normal objective here is to maintain the uniformity attained at the completion of the manipulation stage (e.g. coating or pouring). Drying processes usually involve the application of heat and currents of air (and sometimes the control of humidity in aqueous systems). Air currents and machinery vibrations can perturb the uniformity of such systems, which is undesirable. Unfortunately dispersants used to reduce the viscosity of formulations to aid the wet processing of a product usually cause the formulation to decrease further in viscosity with increasing temperature, which makes the product more prone to perturbations until evaporative losses reverse this process and cause the viscosity to rise.

The object of this invention is to overcome this difficulty by providing an efficient thermally-responsive dispersant that can provide a low-viscosity dispersion at low temperatures, thereby facilitating handling and processing, and a relatively high viscosity dispersion with increasing temperature in order to increase the resistance of the system to mechanical perturbations and to aid the immobilisation of the system by heating, once it has been manipulated into its final desired geometry/form. This process would be facilitated, i.e. more efficient, if the transition in viscosity were sharp (i.e. would occur over a narrow temperature range of, for example, about 10° C.) with large viscosity increment and may be further enhanced if the dispersion were to take on elastic properties above the transition temperature.

A result of the sharp increase in low-shear viscosity (or in complex modulus) or the transition to elastic behaviour on heating is that the structure within the dispersion may resist collapse on drying and so have an increase in porosity. An advantage of more porous layers within an inkjet receiver element is that there is greater capacity for fluid uptake (per unit of dry mass or per dry thickness of the element) and so less material is required in the element, ink uptake (apparent drying) may be faster and the total ink uptake increased. Consequently the image defects of coalescence, mottle and puddling may be reduced.

The dispersant of this invention achieves these aims, the dispersant comprising an anchoring moiety linked to at least one thermally-responsive polymeric stabilising moiety whose solubility in water is critically dependent on temperature, the anchoring moiety containing a net acid or neutral functionality in the case of positively-charged or chargeable particulates and a net basic functionality in the case of negatively-charged or chargeable particulates.

The stabilising moiety consists of a thermally-responsive polymer or co-polymer, preferably vinyl-based, exhibiting a controlled sharp transition from solvation to de-solvation in aqueous solution with increasing temperature, excluding thermally-responsive polymers or co-polymers based on polyalkyleneoxides which do not have such a well-defined thermal response. Indeed WO 2006/067457 teaches by way of comparative examples that the use of polyethoxylated blocks in the stabilizer/buoy part of a potential anchor-buoy form of dispersant is ineffective for dispersing a boehmite dispersion in water at ambient temperatures.

The thermally-responsive character of the polymer moiety is such that the dispersant is solvated and water-soluble (clear solution) below a specific narrow temperature region and is relatively de-solvated and insoluble above this range (forming a cloudy, phase-separating solution). The thermally-responsive polymeric moiety possesses a lower affinity for the particulate surface than the anchoring group below the thermal transition temperature.

A further feature of the invention is that non-thermally-responsive monomers can be randomly introduced into an otherwise thermally-responsive polymer matrix to form a copolymer, enabling the temperature of the solvation/-desolvation transition to be decreased or, more typically, increased over a range of temperature, depending on the degree of 'dilution' of the thermally-responsive matrix and the specific nature of the non-thermally-responsive monomers. By "non-thermally-responsive monomers" is meant herein monomers that do not show a sharp transition to a lower solubility with temperature change.

Thus the thermally-responsive polymeric moiety exhibiting a high solubility at a lower temperature and exhibiting a sharp transition to a lower solubility coefficient at a higher temperature, may be a thermally-responsive homopolymer or a co-polymer comprising two or more such thermally-responsive monomers, or a co-polymer made up from of mixture of monomers such that at least one monomer is thermally-responsive and at least one monomer is non-thermally responsive, (i.e. the latter would give a clear water-soluble solution over all temperature ranges). The introduction of one or more non-thermally-responsive monomers into an otherwise thermally-responsive polymer matrix, enables the solvation/desolvation transition to be varied over a wide range of temperature, e.g. from 32° C. to the boiling point of water, in the case of poly-NIPAM.

The thermally-responsive polymeric moiety is preferably, for example, selected from unsubstituted or substituted poly-N-alkylacrylamides, wherein the alkyl group contains from 2 to 6 carbon atoms, copolymers of N-alkylacrylamides such as poly-NIPAM-co-acrylic acid, polyhydroxypropylcellulose, PNVCap or a polyvinyl-methylether or a combination thereof, but is most preferably poly-NIPAM. The temperature at which the thermal transition takes place may be adjusted not only by copolymerization with a monomer showing less or no thermal response but also by changing the composition of the thermally-responsive monomer. For example, derivatives of poly-NIPAM in which the isopropyl group is made more or less hydrophobic would change the temperature at which the thermal response occurs (as demonstrated, for example, in J. Mater. Chem., 2005, 15, 2796-2800, "Development of fluorescent microgel thermometers based on thermo-responsive polymers and their modulation of sensitivity range." Kaoru Iwai, Yuriko Matsumura, Seiichi Uchiyama and A. Prasanna de Silva). The dispersants may be made responsive also to changes in pH and ionic strength by the inclusion of monomers that have weak acid or weak base properties, e.g. those with carboxylic acid or amine functionalities.

Non-thermally-responsive monomers, which are predominantly hydrophilic and may be included to modify the temperature of transition, may be, for example, for positively-charged or chargeable particulates, acrylamide, N,N-dimethylacrylamide, 2-acrylamido-2-hydroxymethyl-1,3-propandiol, methacrylamide, N-methylacrylamide or N-methylmethacrylamide or a mixture thereof or a polyalkylene oxide. Preferably such a monomer is acrylamide or N,N-dimethyl-acrylamide.

For negatively-charged or chargeable particuylates, non-thermally-responsive monomers, which are predominantly hydrophilic and do not have a strong affinity for negatively-charged surfaces, such as silica, preferably have hydrogen bond-donating character or predominately hydrogen bond-donating character, such as for example, acrylamide, methacrylamide, N-methylacrylamide or N-methyl-methacrylamide or a mixture thereof, preferably acrylamide. Monomers with a strong affinity for such surfaces, such as N,N-dimethylacrylamide and those containing hydroxyl groups, are generally to be avoided (unless sterically inhibited from adsorption by adjacent non-adsorbing groups), although a minor percentage of one of these components may be tolerated.

Alternatively the non-thermally responsive monomer for either positively- or negatively-charged or chargeable particulates may be a neutral, water-dispersible acrylic or methacrylic ester which may include one or more ethylene glycol units.

The non-thermally-responsive monomers may comprise hydrophobic monomers, provided that the polymeric moiety remains hydrophilic in character overall and provided that it contains less than 25% hydrophobic groups and preferably less than 12% hydrophobic groups. An example of a hydrophobic group that may be incorporated is, for example, N-butylacrylamide.

The affinity of the hydrophilic polymer for the surface of the particulates needs to be less than that of the anchoring moiety below the temperature of thermal transition, as otherwise the polymer is likely to adsorb to the surface of the particulates, with the subsequent potential for bridging between the particles which is likely to lead to particle aggregation.

In the case of positively-charged or chargeable particulates, the anchoring moiety is required to be net acidic or neutral. The acid group is preferably selected from a carboxylic acid, sulfonic acid or phosphoric acid, but is more preferably a carboxylic acid, most preferably at least a dicarboxylic acid. The anchoring moiety may contain a hydroxy group or a combination of acidic and hydroxy groups, provided the moiety has a net acidity or neutrality. Moreover one or more amino groups may also be present in the anchoring group in combination with an acid group, so long as there is not an excess of amine groups in the anchoring moiety.

In the case of negatively-charged or chargeable particulates, the anchoring moiety is required to be net basic. The basic group is preferably selected from an unsubstituted or substituted amine, nitrogen-containing heterocycle, which may contain one or more other heterocyclic atoms selected from nitrogen, oxygen and sulfur, or the hydroxide of a quaternary ammonium or pyridinium salt. By way of example only, the basic group may be an unsubstituted or substituted amine, dimethylamine, diethylamine, piperidine, piperazine, thiomorpholine, morpholine, benzimidazole, benzopyrrolidine, pyridine or pyrazole group. Thus, for example, a diethylamine group may be substituted with, for example, one or more hydroxy or halogen or aryl groups, and a heterocyclic compound may be substituted with, for example, an alkyl, arylalkyl or other heterocyclic group, such as, for example a pyridine group. In addition one or more acid groups may be present in the anchoring moiety so long as there is not an excess of acid groups in this moiety. Preferably, however, the basic group is an unsubstituted or a substituted amine group.

In accordance with a preferred embodiment of the invention the dispersant of the invention has the formula (I):—

(I)

wherein

R is an anchor group

L is a linking group and z is 0 or 1;

each M is a monomer unit, which may be the same or different, at least one of which monomer unit is thermally-responsive such that $[M]_w$ has a net thermal-responsivity, and w is 5-200 and;

F is hydrogen or a substituent.

R is preferably selected from either

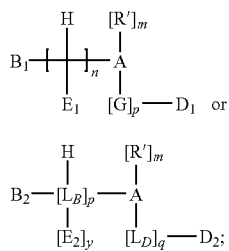

wherein

A is carbon or nitrogen;

R' is hydrogen or an unsubstituted or substituted alkyl, aryl or heterocyclic group and m is 1 when A is carbon and m is 0 when A is nitrogen; and in structure (a):—

$D_1$ is a hydrogen atom, an unsubstituted or substituted amino group or an acid group or an ester or amide thereof, or an unsubstituted or substituted alkyl group (including an alkyl group substituted with one or more acid groups or an ester or amide thereof);

G is a carbonyl group or an unsubstituted or substituted alkylene, aminoalkylene or oxyalkylene group and p is 0 or 1;

each $E_1$ is independently hydrogen, an unsubstituted or substituted amino group or an acid group or an ester or amide thereof and n is 0 or an integer from 1 to 10;

$B_1$ is an acid group or an ester or amide thereof, or a hydroxy group;

$D_1$ and L or $D_1$, G and L may combine with A to form an unsubstituted or substituted 5-, 6- or 7-membered ring which may include one or more further heteroatoms selected from nitrogen, oxygen and sulfur;

with the proviso that (i) the number of acid groups is equal to or greater than the number of amino groups therein and (ii) there is at least one hydroxy or acid group; and in structure (b):—

$D_2$ and each $E_2$ is independently hydrogen, unsubstituted or substituted alkyl or a basic group or an acid group or an ester or amide thereof and y is 0 or 1;

$L_B$ and $L_D$ are linking groups, which are the same or different, and p and q are each independently 0 or 1;

$B_2$ is a basic group; and $B_2$, $L_B$, $D_2$, $L_D$ and L may combine with A to form more one or more rings which may include one or more further heteroatoms selected from nitrogen, oxygen and sulphur, with the proviso that the number of basic groups is greater than the number of any acid groups therein.

Thus in one embodiment the formula (I) may have the structure (IA):—

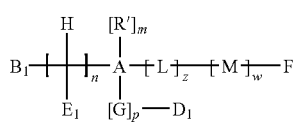

and in another embodiment the formula (I) may have the structure (IB)

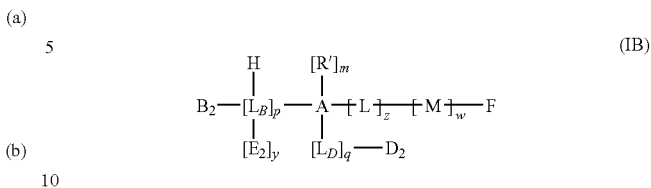

Preferably A is carbon and R' is hydrogen or a methyl group. L, when present, is preferably a sulfur atom with z=1. However L may also be a chain of up to about 20 atoms that may contain, for example, one or more unsubstituted or substituted alkylene, ester, thioester, amide, thioamide, ketone, thioketone, ether or thioether groups, either alone or in combination. By way of example only, L may be a polyalkylenethio group [—$(CH_2)_q$—S] group, wherein q is an integer from 1 to 20 and especially 9, a group —$CH_2COCH_2S$, a group —CONH—$(CH_2)_r$S, wherein r is from 1 to 5 or a group —CO[$CH_2]_t$S, wherein t is from 1 to 20. z may alternatively be 0 so that there is no linking group, L, present.

The number of monomer units (w) is preferably 10-100, more preferably 10 to 50. Preferably the thermally-responsive monomer(s) in the thermally-responsive polymeric stabilising moiety is N-vinylcaprolactam or N-isopropylacrylamide, more preferably N-isopropylacrylamide. In particular in the case of N-isopropylacrylamide the number of units from 20 to 30 has been found to be particularly useful.

When a non-thermally responsive monomer is present, it is preferred that this is acrylamide or N,N-dimethylacrylamide for positively-charged or chargeable particles or acrylamide, methacrylamide, N-methacrylamide or N-methylmethacrylamide for negatively-charged or chargeable particles.

M may have either of the structures shown below, with the point of attachment to F being on the right hand side:

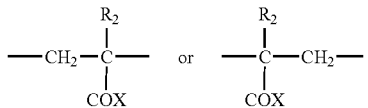

wherein

X is a group $NR_0R_1$ or a group —$(Y)_v OR_1$ each $R_o$, $R_1$ and $R_2$ is independently hydrogen or an unsubstituted or lower alkyl group having 1 to 6 carbon atoms, preferably 1 to 4 carbon atoms, more preferably 1 to 3 carbon atoms; Y is an ethylene glycol unit and v is 0-20, preferably 1-10.

F is generally hydrogen but may also be a terminal substituent known to one skilled in the art as not having a significant effect on the aqueous solubility of the molecule. It may be, for example, a halogen atom, an unsubstituted or substituted alkyl group, a thiol, a neutral thioether, ether, ester, or an alkyl- or aryl-sulfonate group.

In formula (IA), when $B_1$, $E_1$ or $D_1$ is an acid group, or when $D_1$ or G is substituted with one or more acid groups, the acid is preferably selected from a carboxylic acid, sulfonic acid or phosphoric acid, preferably a sulfonic acid or more preferably a carboxylic acid group.

$D_1$ is preferably hydrogen or an acid group and preferably p is 0. n is generally 0 or 1 but when it is an integer from 2 to 10, each $E_1$ may be the same or different and is preferably hydrogen or a carboxylic acid group. $B_1$ may a hydroxy group but is preferably a sulfonic or more preferably a carboxylic acid group. The alkylene group in G may contain an acid group, preferably a carboxylic, sulfonic acid or phosphoric acid group. The more preferred anchoring groups contain at least two acid groups, preferably carboxylic acid groups, attached either in a [1,1], [1,2] or [1,3] relationship.

In formula (IB) $L_B$, when present, is a fragment of 1 to 20 atoms that may contain, for example, one or more unsubstituted or substituted alkylene, arylene, ester, thioester, amide, thioamide, ketone, thioketone, ether or thioether groups, either alone or in combination. Thus $L_B$ may be, by way of example only, an unsubstituted or substituted methylene, ethylene or propylene, keto, $CONH(CH_2)_r$, $(CH_2)_rNR''(CH_2)_r$, $(CH_2)_rO(CH_2)_r$, $CHR_3COOR''$, wherein R'' is hydrogen or an alkyl group and $R_3$ is a substituted alkylene group, $(CH_2)_r$ NHCOCHCH$_2$CONH(CH)$_{2r}$, phenylene, CH$_2$CHROphenylene or phenyleneCOO(CH$_2$)$_r$ group, where each r is independently from 1 to 5 and R is independently hydrogen or an alkyl group. p may alternatively be 0 so that there is no linking group $L_B$ present, but preferably p is 1 and $L_B$ is a methylene or ethylene group.

$L_D$ when present, is a fragment of 1 to 20 atoms that may contain one or more unsubstituted or substituted alkylene, arylene, ester, thioester, amide, thioamide, ketone, thioketone, ether or thioether groups, either alone or in combination. Thus $L_D$ may be, by way of example only, an ethylene, a CONH(CH$_2$)$_r$ or a (CH$_2$)$_r$CONR$_4$(CH$_2$)$_r$ group, wherein r is from 1 to 5 and $R_4$ is a substituted alkylene group. However it is preferred that q is 0 so that there is no linking group $L_D$ present.

Although $D_2$ is preferably hydrogen or a basic group such as, for example, an amino, dimethylamino or diethylamino group, it may also be an acid group or an ester or amide group. Generally y is 0 such that there is no $E_2$ group but when present this may be as defined for $D_2$ and may thus include hydrogen, an unsubstituted or substituted alkyl group a basic or an acidic group or an ester or amide thereof, preferably a dimethylamino or diethylamino group.

$B_2$ is preferably selected from unsubstituted or substituted amine, nitrogen-containing heterocycle, which may contain one or more other heterocyclic atoms selected from nitrogen, oxygen and sulfur, or the hydroxide of a quaternary ammonium or pyridinium salt. More preferably $B_2$ is an unsubstituted or substituted amine group. The compound of formula (IB) can thus contain up to three basic groups but it is essential that the number of basic groups is greater than the number of any acidic groups to provide the required overall basicity.

The chemical structures of the anchoring moieties defined in the invention are important to the function of the materials of the invention both as highly effective dispersants at low temperatures and ineffective dispersants at higher temperatures. As indicated earlier, for positively-charged or chargeable particles the anchor moiety contains one or a small number of acidic groups and/or a hydroxy group, and may include one or more amino groups, so long as the moiety has a net acidity or neutrality. Preferably the anchor moiety contains one or especially two carboxylic acid groups.

In the case of negatively-charged or chargeable particles the anchor group contains one or a small number of basic groups and therefore has a net basicity. The basic group(s) are preferably selected from an unsubstituted or substituted amine, nitrogen-containing heterocycle, which may contain one or more other heterocyclic atoms selected from nitrogen, oxygen and sulfur, or the hydroxide of a quaternary ammonium or pyridinium salt, but is preferably an unsubstituted or substituted amino group.

Structures pertaining to formula (I) are illustrated, but not limited to, the following examples (note they are general in terms of the degree of polymerisation w, which is defined above, and x relates to the thermally-responsive monomers and y to the non-thermally-responsive monomers, when present and the position of x or y relative to the anchoring group is not important). Examples I-1 to I-18, I-64, I-65, I-67, I-69 and I-70 relate to positively-charged or chargeable particles and Examples I-19 to I-63, I-66 and I-68 relate to negatively-charged or chargeable particles. Preferably x is an integer from 10 to 25 and y is an integer from 0 to 10.

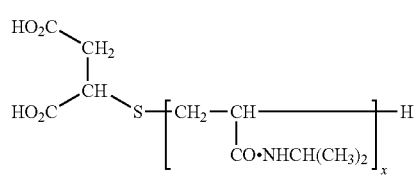

I-1

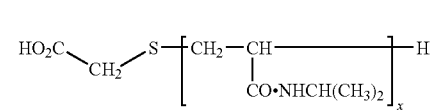

I-2

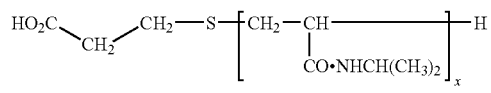

I-3

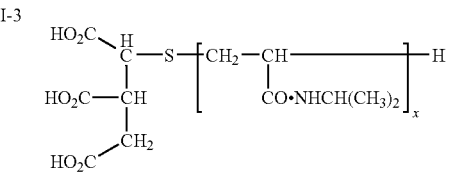

I-4

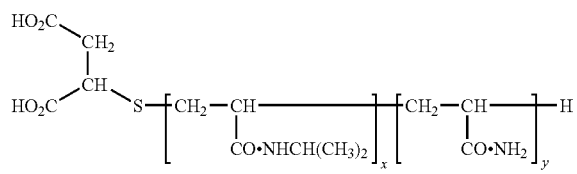

I-5

-continued
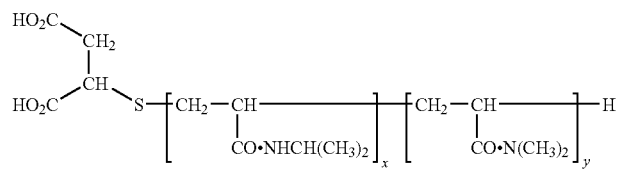
I-6
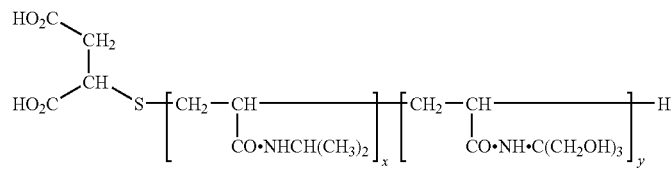
I-7
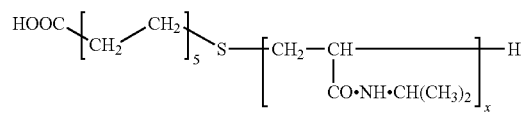
I-8
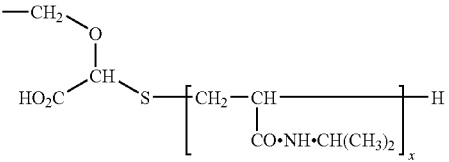
I-9
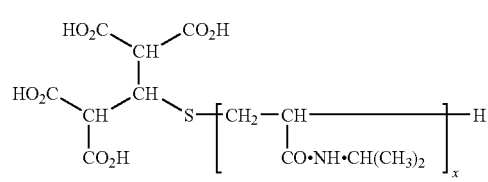
I-10
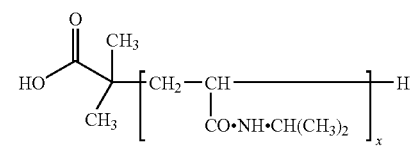
I-11
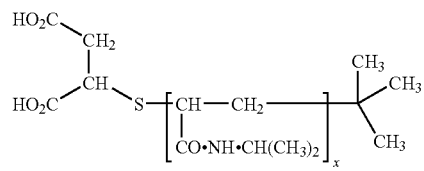
I-12
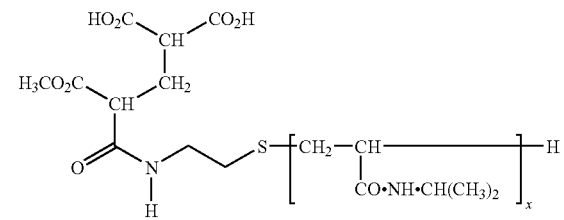
I-13
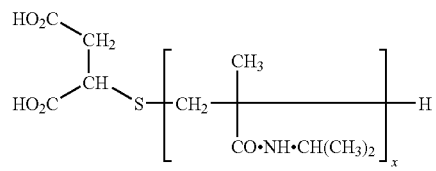
I-14
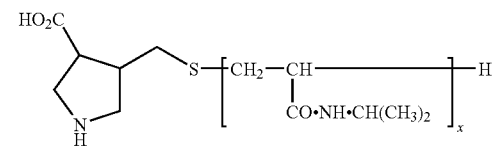
I-15
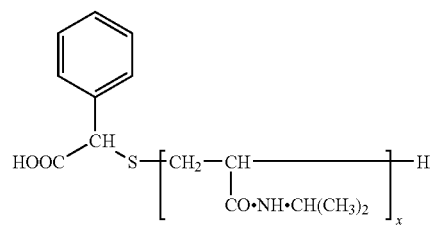
I-16
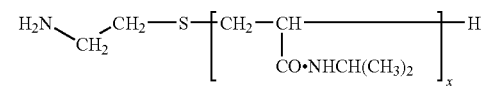
I-17
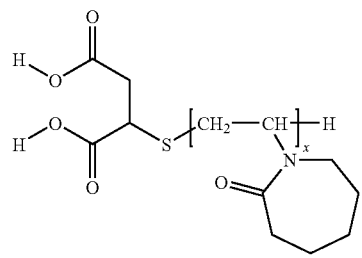
I-18
I-19

-continued

I-38
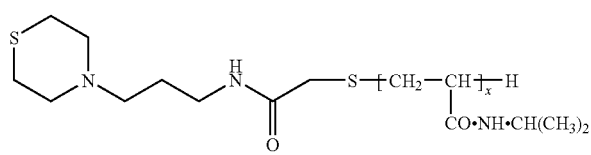
I-39
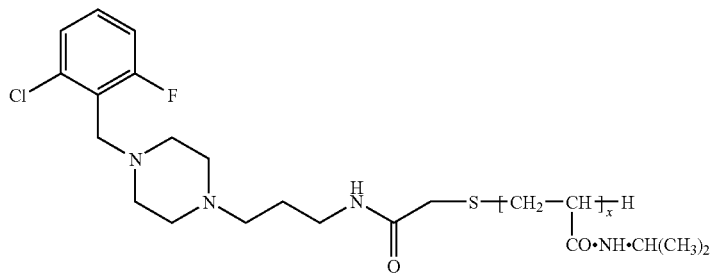
I-40
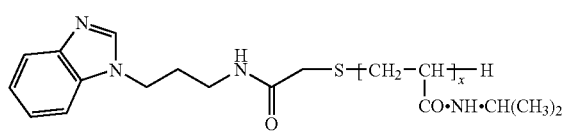
I-41
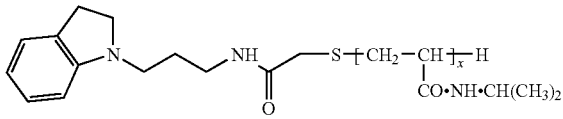
I-42
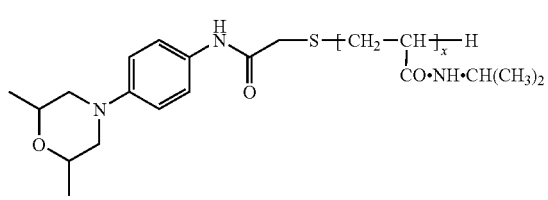
I-44
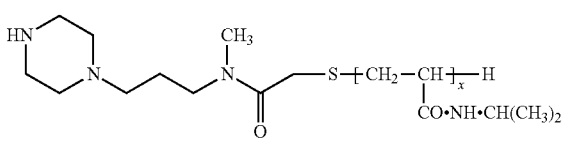
I-45
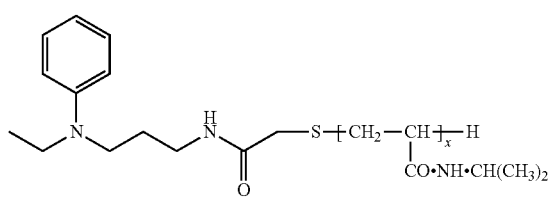
I-46
(shown)
I-47
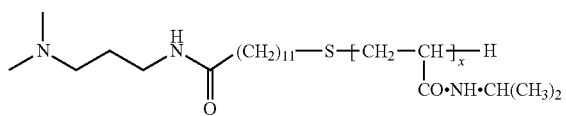
I-49
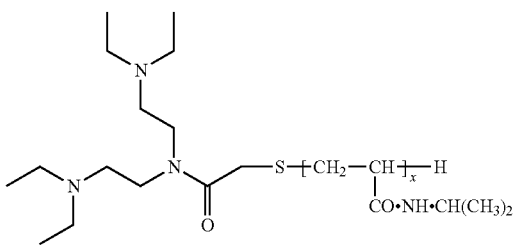
I-50
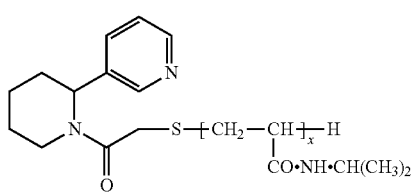
I-51
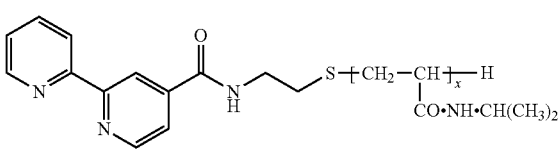

-continued

-continued

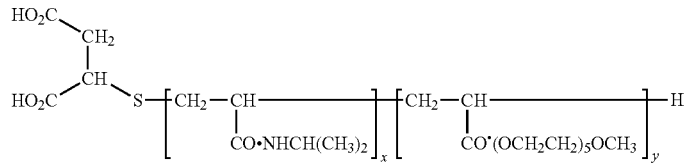

I-67

I-68

I-69 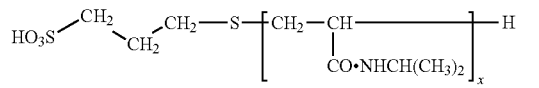

I-70 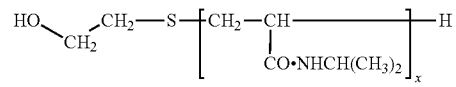

More specific structures of some of the above systems, i.e. where the average degree of polymerisation is defined, are illustrated in the following examples:

Examples of particulate systems that are or can be positively-charged for use in the invention are: metal oxides, metal hydroxides, metal carbonates, nitrides, ceramics and

| Dispersant | Average Structure (to nearest integer) | $M_n$/ g·mol$^{-1}$ |
|---|---|---|
| I-1a | HO$_2$C−CH$_2$−CH(HO$_2$C)−S−[CH$_2$−CH(CO·NHCH(CH$_3$)$_2$)]$_{25}$−H | 2979 |
| I-1b | HO$_2$C−CH$_2$−CH(HO$_2$C)−S−[CH$_2$−CH(CO·NHCH(CH$_3$)$_2$)]$_{20}$−H | 2410 |
| I-5a | HO$_2$C−CH$_2$−CH(HO$_2$C)−S−[CH$_2$−CH(CO·NHCH(CH$_3$)$_2$)]$_{22}$[CH$_2$−CH(CO·NH$_2$)]$_4$−H | 2990 |
| I-6a | HO$_2$C−CH$_2$−CH(HO$_2$C)−S−[CH$_2$−CH(CO·NHCH(CH$_3$)$_2$)]$_{10}$[CH$_2$−CH(CO·N(CH$_3$)$_2$)]$_{10}$−H | 2273 |
| I-19a | H$_2$N−CH$_2$−CH$_2$−S−[CH$_2$−CH(CO·NHCH(CH$_3$)$_2$)]$_{12}$−H | 1440 |
| I-69a | HO$_3$S−CH$_2$−CH$_2$−CH$_2$−CH$_2$−S−[CH$_2$−CH(CO·NHCH(CH$_3$)$_2$)]$_{25}$−H | 3007 | metals and positively-charged or chargeable latexes, all at a pH below their isoelectric point (IEP). The present invention is particularly suited to such inorganic particulates with an IEP above the pH of water saturated with carbon dioxide, i.e. pH>5.8, but is not limited to this condition, since the pH of a system can be lowered below its IEP by the addition of a suitable acid, provided the system and any associated product or process can tolerate the presence of the acid. IEPs can also be manipulated to advantage by the use of different ion types in solution via specific adsorption.

Examples of metal oxides that possess an IEP pH>5.8 are, for example, $Al_2O_3$, $CeO_2$, $Co_3O_4$, $Cr_2O_3$, $CuO$, $Eu_2O_3$, $Fe_2O_3$, $HgO$, $MgO$, $NiO$, $PuO_2$, $TiO_2$, $UO_2$, $ZnO$ and $ZrO_2$. Metal hydroxides that possess an IEP pH>5.8 are exemplified by $Al(OH)_3$, $Cu(OH)_2$, $Fe(OH)_3$, $Mn(OH)_2$, $Mg(OH)_2$ and $Ni(OH)_2$. An example of a carbonate that possesses an IEP pH>5.8 is $CaCO_3$, whilst an example of a nitride that possesses an IEP pH>5.8 is $Si_3N_4$. Metals that possess an IEP pH>5.8 are, for example, Ni, Al, Cu, Zn, Co and Cr and examples of ceramics that possess an IEP>pH 5.8 are Y-TZP, 12Ce-TZP and Y-TZP/12Ce-TZP (Journal of Materials Science, 2002, 37, 1661-1665).

Examples of particulate systems that are or can be negatively-charged for use in the invention are: certain oxides/hydroxides, which include metallic and non-metallic examples, ceramics and metals and negatively-charged or chargeable latexes, at a pH above their isoelectric point. The present invention is particularly suited to such inorganic particulates with an IEP below the pH of water saturated with carbon dioxide, i.e. pH<5.8, but is not limited to this condition, since the pH of a system can be raised above its IEP by the addition of a suitable base, provided the system and any associated product or process can tolerate the presence of the base. IEPs can also be manipulated to advantage by the use of different ion types in solution via specific adsorption.

Examples of oxides that possess an IEP pH<5.8 are, for example, those of silicon, $SiO_2$ (silica), titanium $TiO_2$ (anatase), tellurium $TeO_2$, molybdenum, $H_2MoO_4$, tin $SnO_2$ and zirconium $ZrO_2$ (zirconia). The oxide of cobalt, $CO_3O_4$, can also possess an IEP<5.8 depending on its method of preparation. Metals that possess an IEP pH<5.8 are, for example, Mo, Pt, Te and Sn.

In general, the particulates relating to this invention range in particle size from 1 nm to 100 micrometer, preferably from 5 nm to 10 micrometer, more preferably from 10 nm to 3 micrometer and most preferably from 50 nm to 1 micrometer.

The composition comprises positively- or negatively-charged or chargeable particulates and an aqueous dispersing medium together with one or more dispersants of the invention and optionally a water-soluble polymeric binder and/or a pH modifier. As used herein the term 'dispersion' is generally used to refer more specifically to the particulates, aqueous dispersing medium, dispersant and polymer, whereas the term 'composition' is generally used to refer to the dispersion together with any added components which may be required, for example, for rendering the dispersion suitable for practical use. According to the invention, the composition is prepared using a mechanical mixing device such as, for example, a stirrer, homogeniser, milling device or high-pressure disperser.

If a water-soluble binder (or binders) is present it may be any binder known to the skilled person to be suitable for the purpose. Thus it may be a polymer, for example, starch and its modified products, polyvinyl alcohol, copolymers of vinyl alcohol and vinyl acetate (which are often referred to as PVAs) and their modified products (e.g. acetyl acetylated polyvinyl alcohol), a polyvinyl acetate, hydroxy-cellulose, hydroxymethyl cellulose, carboxymethyl cellulose, polyvinylpyrrolidone, polyvinylacetal including its derivatives and protein-derived polymers, such as gelatin and its derivatives. Particularly preferred are polyvinyl alcohols having a degree of hydrolysis of 86-89%, such as Gohsenol™ GH-17, Gohsenol™ GH-20 and Gohsenol™ GH-23, obtainable from Nippon Gohsei, Japan. It may also be a latex polymer such as, for example, a styrene acrylic latex or styrene butadiene latex. The amount of binder will vary from application to application, but it is generally present in an amount of from 0 to 40% w/w with respect to the particulates, more preferably from 0 to 20% w/w, most preferably from 0 to 10% w/w.

A pH modifier could be any suitable organic or inorganic acid (mono or polyacid), but preferably a strong acid such as hydrochloric acid or nitric acid, which may also enhance the efficacy of the reduction in viscosity following high shear stress conditions.

Optionally, the composition may include other additives such as, for example, surfactants, coating aids, fillers or plasticisers, colorants (pigments or dyes), frost inhibitors, hardeners, accelerators, antioxidants, bactericides, antistatic agents, UV absorbers, UV light stabilizers and materials that limit the adverse effects of atmospheric gases or contaminants. These may be introduced into the composition to produce a more complex composition, for example, by solubilising or dispersing the additives into an aqueous solution or dispersion and mixing the resulting solution or dispersion of additives with the initial aqueous dispersion of solid particulate.

The particulate content in the dispersions of the invention normally ranges from a volume fraction of particulates of about 0.01 to about 0.8, preferably about 0.04 to about 0.6, more preferably about 0.15 to about 0.4. The wt % content will vary with density of the dispersed particulate, but in general the level is chosen such that the dispersion can be dispersed well with the dispersants of the invention and that the final dispersion is processable and manageable due to its improved dispersability and flowability.

The dispersant content in the dispersion in the case of the positively-charged or chargeable particulates is typically used in the range 1:1000 to 60:1000 w/w particulate, preferably 2:1000 to 50:1000 w/w particulate, more preferably 3:1000 to 45:1000 w/w particulate and most preferably 7:1000 to 16:1000 w/w particulate.

The dispersant content in the dispersion in the case of the negatively-charged or chargeable particles is typically used in the range 1:1000 to 1000:1000 w/w particulate, preferably 10:1000 to 800:1000 w/w particulate, more preferably 30:1000 to 600:1000 w/w particulate and most preferably 50:1000 to 500:1000 w/w particulate. Silica is of much lower density than most metal oxides and there are many sources that possess high surface area per gram and hence the ratio of dispersant to solid required on a weight basis to provide good dispersion can be much higher than that experienced for positively-charged or chargeable particulate systems.

It is well known to those skilled in the art that the dispersants act at the particle surface, and thus that higher concentrations of dispersant will be required as particle sizes are reduced further and further due to the resulting increase in surface area.

A particular advantage of the dispersions of the invention is in their use as components of coating materials in view of their relatively low viscosity, providing improved dispersability and flowability at low temperatures below the thermal point of the dispersant, coupled with maintenance of the post-coating uniformity of the coated composition by their immobilisation after coating, by heating the coated dispersion significantly above the thermal transition temperature of the dispersant. The elasticity or increased viscosity above the thermal transition temperature causes immobilisation of the system by heat and helps maintain the coated uniformity of the system in the presence of machinery vibration and air currents, increasing its resistance to external perturbations arising from air currents and vibrations.

Coating compositions using dispersants of the invention may be applied to one or both of a substrate surface through pre-metered or post-metered coating methods. These methods may include dip-coating, wound-wire rod coating, grooved rod coating, smooth rod coating, air knife coating, bent or bevelled blade coating, gravure coating, forward roll coating, reverse roll coating, multiple roll coating, slide coating, bead coating, extrusion coating and curtain coating. Known coating and drying methods are described in further detail in Research Disclosure No. 308119, published December 1989, pages 1007 to 1008. The coating composition can be coated either from water, water-based mixtures or organic solvents but water is preferred.

The choice of coating process would be determined from the economics of the operation and, in turn, would determine the formulation specifications such as coating solids, coating viscosity and coating speed. After application to the substrate, the coating fluids are generally dried by simple evaporation, which may be accelerated by known techniques such as convection heating. Further treatment, such as calendaring, may be used to apply a surface texture.

The substrate may be, for example, textiles, wood, metal or plastic, depending upon the proposed application. In a preferred embodiment, the substrate or support for use in the invention is paper, resin-coated paper or a transparent support. It may have a thickness of from about 10 to about 500 µm, preferably from about 50 to about 300 µm. Antioxidants, antistatic agents, plasticizers and other known additives may be incorporated into the support, if desired.

If the composition is to be used in an inkjet recording element, the support may be any of those usually used for inkjet receivers, such as resin-coated paper, paper, polyesters, or microporous materials such as polyethylene polymer-containing material sold by PPG Industries, Inc., Pittsburgh, Pa. under the trade name of TESLIN™, TYVEK™ synthetic paper (DuPont Corp.), and OPPalyte™ films (Mobil Chemical Co.) and other composite films listed in U.S. Pat. No. 5,244,861. Opaque supports include plain paper, coated paper, synthetic paper, photographic paper support, melt-extrusion-coated paper and laminated paper, such as biaxially oriented support laminates. Biaxially oriented support laminates are described in U.S. Pat. Nos. 5,853,965; 5,866,282; 5,874,205; 5,888,643; 5,888,681; 5,888,683 and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers from high end papers, such as photographic paper, to low end papers, such as newsprint.

The patents and publications referred to herein are incorporated by reference in their entirety.

The invention will now be described with reference to the following examples, which are not however to be construed as limiting the scope thereof.

EXAMPLES

Synthesis of Dispersants

The dispersants may be prepared by methods analogously to the examples herein and in accordance with Makromoleculare Chemie, (1992), 193(9), pages 2505-2517.

Example A

Synthesis of Compound (I-1a)

Mercaptosuccinic acid (1.50 g, 0.010 mol), N-isopropylacrylamide (56.58 g, 0.500 mol) and 2,2'-azobis(2-methyl-propionitrile) (0.56 g) were suspended in methanol (1000 ml) in a 3N flask equipped with a reflux condenser. The mixture was degassed for 20 min. by bubbling through argon and then brought to reflux under argon atmosphere. Reflux was continued for a total of 40 h to ensure complete consumption of the monomer. The resulting solution was evaporated under reduced pressure to give a white solid (58.50 g, 100%). Analysis was consistent with the desired structure.

Example B

Synthesis of Compound (I-5a)

Mercaptosuccinic acid (0.375 g, 2.50 mmol), N-isopropylacrylamide (11.32 g, 0.100 mol), acrylamide (1.78 g, 0.025 mol) and 2,2'-azobis(2-methyl-propionitrile) (0.13 g) were suspended in methanol (250 ml) in a 3N flask equipped with a reflux condenser. The mixture was degassed for 30 min. by bubbling through argon and then brought to reflux under argon atmosphere. Reflux was continued for a total of 24 h to ensure complete consumption of the monomer. The resulting solution was evaporated under reduced pressure to give a white solid (13.58 g, 100%). Analysis was consistent with the desired structure.

Example C

Synthesis of Compound (I-6a)

Mercaptosuccinic acid (1.64 g, 0.011 mol), N-isopropylacrylamide (12.40 g, 0.11 mol), N,N-dimethylacrylamide (10.95 g, 0.11 mol) and 2,2'-azobis-(2-methylpropionitrile) (0.25 g) were suspended in methanol (250 ml) in a 3N flask equipped with a reflux condenser. The mixture was degassed for 20 min. by bubbling through argon and then brought to reflux under argon atmosphere. Reflux was continued for 48 h. The resulting solution was evaporated under reduced pressure to give an off-white solid (28.50 g, 100%). Analysis was consistent with the desired structure.

Example D

Synthesis of Compound (I-19a)

2-Aminoethanethiol hydrochloride 98% (0.25 g, 0.0022 mol), N-iso-propylacrylamide (15.00 g, 0.133 mol) and 2,2'-azobis(2-methylpropionitrile) (0.09 g) were suspended in methanol (500 ml) in a 3N flask equipped with a reflux condenser. The mixture was degassed for 20 min. by bubbling argon gas through it and then brought to reflux under argon atmosphere. Reflux was continued for a total of 44 h to ensure complete consumption of the monomer. The resulting solution was evaporated under reduced pressure to give a white solid (15.20 g, 100%). Analysis was consistent with the desired structure.

An ion-exchange column was charged with Amberlyst A26 (OH)(25 g) and covered with deionised water. 2M Aqueous sodium hydroxide (20 ml) was added to the column, and this was flushed through with deionised water (300 ml). The final pH of the eluent was between 6 and 7. The oligomeric hydrochloride from above (4.00 g) was dissolved in water (30 ml), and added to the column. The column was eluted with water and 25 ml fractions collected. Eluent cuts containing product were combined and evaporated to dryness, affording the free amine-terminated oligomer. Analysis confirmed the presence of the terminal amine group.

Comparative Examples

The efficacy of the dispersants of the invention was tested further by comparing their performance against materials not within the scope of the invention and also with controls with no dispersant. The range of comparative materials includes either dispersants that have been described in the prior art or compounds that contain anchor or stabilizer moieties that have been described in the prior art.

The compounds used in these comparisons, are listed hereinafter:

| Dispersant | Structure | $M_n$/ g·mol$^{-1}$ | Name |
|---|---|---|---|
| C1 | | 1300 | N,N-dimethylacrylamide derivative of mercaptosuccinic acid WO 2006/067453, WO 2006/067457 |
| C2 | | 3212 | Hexaethylglycol derivative of mercaptosuccinic acid |
| C3 | | ~1354 | WO 2007/071960 |
| C4 | N-(triethoxypropyl)-O-polyethylene oxide urethane | | Gelest Inc. CAT. No. SIT8192.0 CAS no. 37251-86-8 U.S. Pat. No. 6,489,017 |
| C5 | | 2060 | Acrylamide derivative of mercaptosuccinic acid WO 2006/067453 |

Example 1

Rheology of Control Dispersion 1 (37 wt % Catapal™ 200, 1.1 wt % PVA and 61.9 wt % Water)

Catapal™ 200 is a boehmite form of alumina manufactured by Sasol™. It is a representative particulate oxide/hydroxide system that forms an aqueous dispersion of fine positively-charged particles on addition to water. The manufacturers of boehmite typically quote the average crystallite size and the average dispersed particle size for a given composition and set of conditions (e.g. 10 wt % boehmite in 0.4 wt % $HNO_3$). In the case of Catapal™ 200, it has an average crystallite size of 40 nm and an average dispersed aggregate size of 140 nm. In this example the binder is a PVA, Gohsenol™ GH17, manufactured by Nippon Gohsei.

The Control 1 dispersion was prepared as follows: 5.92 g of Catapal™ 200 was weighed into a 28 ml vial and 8.32 g of water added (this amount depending on the amount of water to be introduced in the aqueous solution of PVA). 1.76 g of an aqueous solution of PVA containing 10 wt % Gohsenol™ GH17 was added immediately and then the mixture hand-stirred for 20 min. until it produced a uniform disperse system with no visible lumps of aggregate. The samples were left in their disperse state overnight and then given a final stir to checked for uniformity. This procedure produced small-scale dispersions of Catapal™ 200 with reproducible rheological properties.

The resulting dispersion was subjected to rheological measurements under oscillatory shear. The measurements were made using a Bohlin™ CS50 rheometer fitted with the small Bohlin™ sample cell C2.3/26. The samples were loaded into the small sample cell and oscillation experiments were carried out at a frequency of 1 rad·s$^{-1}$ with the stress controlled via feedback to give low strain amplitude (0.003), subject to a minimum oscillatory stress of 0.0385 Pa. The use of low shear (stress and strain) ensured that the measurements characterised the sample but did not disrupt it, particularly when delicate processes such as aggregation were taking place. A temperature cycle was imposed upon the sample, specifically from 20 to 60° C., with a 5 min. hold at the start and finish, and a temperature gradient of 1° C.·min$^{-1}$. The rheometer gives more than one parameter of response from the measurements, however the main one considered hereinafter is the "complex modulus", G*, which is a measurement of the overall resistance of the sample to deformation. Fluid systems are consequently characterised by relatively low values of G* (e.g. in these systems by a value of G* less than ~3 Pa) and solid-like systems by relatively high values of G* (e.g. in these systems by a value of G* greater than ~30 Pa).

Figure 2:
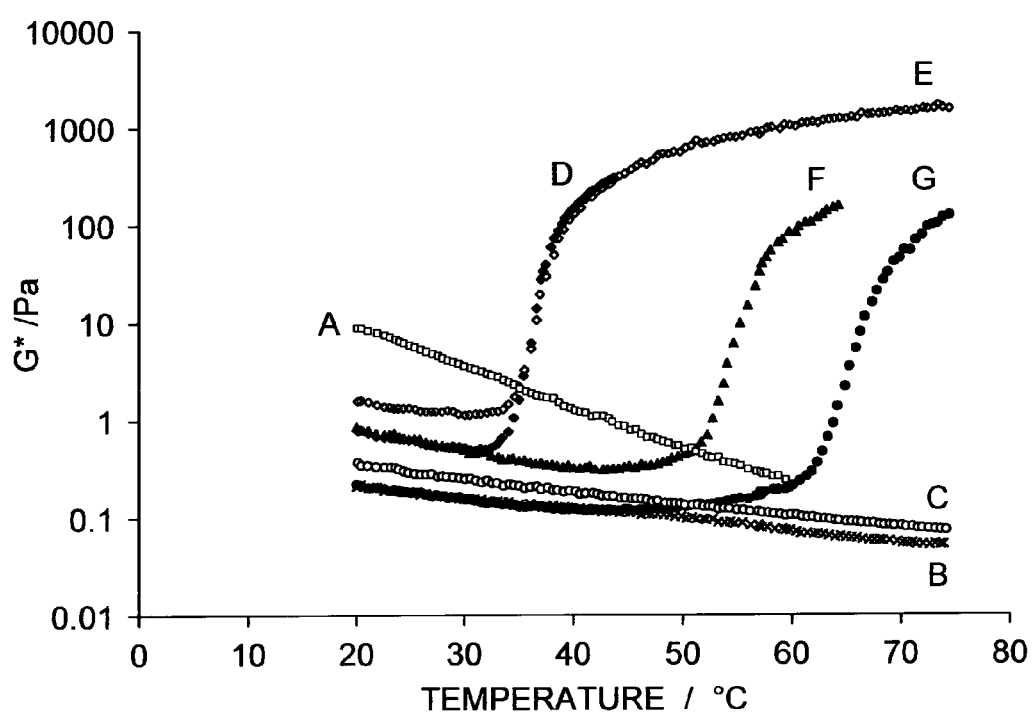
FIG. 2 is a logarithmic plot corresponding to FIG. 1 for Control 1 alone (Curve A) and in combination with dispersants I-1a, I-5a or I-6a, comparison dispersant C1 (Curve B), comparison dispersant C2 (Curve C) and dispersant I-1b (Curve E).

The complex modulus G* of the Control 1 dispersion prepared above was plotted as a function of temperature in FIGS. 1 and 2 and is represented by Curve A in both figures: G* is linearly scaled in FIG. 1 and logarithmically scaled in FIG. 2. The other curves in FIGS. 1 and 2 relate to comparative examples and selected examples of the invention.

As will become apparent hereinafter, a linear plot is particularly useful for characterising thermal transitions (if present), whereas the logarithmic scaling of the data is particularly useful for differentiating relative fluidity in fluid systems, i.e. in systems with no thermal transition and systems at temperatures below their thermal transition. In this case, the Control 1 dispersion was best characterised by FIG. 2 as it has no thermal transition. Curve A is consistent with the observation that the Control 1 system was found to be a very viscous fluid at 20° C. (characterised by a G* value of ~8 Pa) and that it became increasingly fluid with increasing temperature (characterised by a G* value of ~1 at around 40° C. and a G* value of ~0.2 at 60° C.). In fact, the increase in fluidity expressed in terms of the decrease in G* value was approximately linear on the log scale. The low value of G* at 60° C. represented a high fluidity for this degree of loading of Catapal™ 200 in water, particularly in relation to its more viscous nature at 20° C.

The rheological character of the Control 1 system with respect to temperature has two implications. Firstly, the very viscous nature of the system at room temperature would make it difficult to process the formulation at ambient conditions (e.g. mixing and fluid transport). Secondly, its increasing fluidity with increasing temperature would make the formulation more prone to mechanical perturbations during a drying process based on heating, for example in post-coating drying or moulding operations.

Example 2

Rheology of Control Dispersion 1+Comparison Dispersant C1

The objective of this example was to show that a representative preferred material from WO 2006/067453 and WO 2006/067457, disclosing suitable dispersants for positively-charged oxide/hydroxide particulate systems, does not cause a sudden rheological transition with temperature when used as a dispersant in the Control 1 dispersion system.

This example was made up in the same way as Example 1, with the exception that an aqueous solution of the dispersant C1 was added in place of the water, such that the final concentration of C1 in the system was 0.8 wt %.

The rheology under oscillatory shear of the resulting dispersion was then measured as a function of temperature exactly as described in Example 1, but over the temperature range 20-75° C.

The complex modulus G* of this example was plotted as a function of temperature in FIG. 2 (G* on a logarithmic scale), and is represented by Curve B. The following points can be observed:

1. The presence of the dispersant C1 reduced the complex modulus with respect to the Control 1 system with no dispersant over the whole temperature range investigated (20-60° C.), showing that the dispersant reduced the interaction between the Catapal™ 200 particulates. However, the differential with the Control 1 system reduced with increasing temperature.
2. As with the Control 1 system, the dispersion gave a reduction in G* with increasing temperature that was approximately linear on the log scale, albeit with a lesser slope, with no sign of a sudden transition in rheological behaviour.

Thus in summary, the presence of the dispersant C1 reduced the complex modulus of the system relative to the Control 1 dispersion by over an order of magnitude at room temperature and would thus improve the ease of mixing and fluid transport of the dispersion at ambient conditions, relative to the more viscous Control 1 dispersion. However, the increased fluidity, plus the characteristic of increasing fluidity with increasing temperature, would make the formulation even more prone to mechanical perturbations during a drying process based on heating, for example in post-coating drying or moulding operations.

Example 3

Rheology of Control Dispersion 1+Comparison Dispersant C2

The objective of this example was to show that a representative dispersant material based on an anchored stabiliser with a small terminal anchoring group similar to those of this invention, and a stabilising group based on the thermally-responsive polymer polyalkyleneoxide, did not show the well-defined rheological response with increasing temperature exhibited by the materials for use in this invention.

This example was made up as in Example 1, with the exception that an aqueous solution of the dispersant C2 was added in place of the water, such that the final concentration of C2 in the system was 0.8 wt %.

The rheology under oscillatory shear of the resulting dispersion was then measured as a function of temperature exactly as described in Example 1, but over the temperature range 20-75° C.

The complex modulus G* of this example was plotted as a function of temperature in FIG. 2 (G* on a logarithmic scale), and is represented by Curve C. The following points can be observed:

1. The presence of the dispersant C2 reduced the complex modulus with respect to the Control 1 system with no dispersant over the whole temperature range investigated (20-60° C.), showing that the dispersant reduced the interaction between the Catapal™ 200 particulates. However, the differential with the Control 1 system reduced with increasing temperature.
2. As with the Control 1 system, the dispersion in this example gave a reduction in G* with increasing temperature that was approximately linear on the log scale, albeit with a lesser slope, with no sign of a sudden transition in rheological behaviour.
3. The dispersant C1 from Example 2 was consistently more effective at reducing G* than dispersant C2 over the whole temperature range investigated, i.e. by ~0.2 of a log unit (representing a factor of ~1.6).

In summary, the presence of the dispersant C2 behaved similarly to the dispersant C1. It reduced the complex modulus of the system relative to the Control 1 dispersion by over an order of magnitude at room temperature and would thus improve the ease of mixing and fluid transport of the dispersion at ambient conditions relative to the more viscous Control 1 dispersion. However, the increased fluidity of the current example, plus the characteristic of increasing fluidity with increasing temperature, would make the formulation even more prone to mechanical perturbations during a drying process based on heating, for example in post-coating drying or moulding operations.

Example 4

Rheology of Control Dispersion 1+Dispersant of Invention, I-1a

The objective of this example was to show that a representative dispersant of the invention based on an anchored stabiliser with a small terminal anchoring group and a stabilising group based on a thermally-responsive polymer, structured as described for positively-charged oxides/hydroxides, exhibits the strong rheological response desired with temperature. As with the comparative examples (Examples 2 and 3) the Control 1 dispersion formulation was selected as the test bed for investigating the behaviour of the dispersant I-1a.

This example was made up in the same way as Example 1, with the exception that an aqueous solution of the dispersant I-1a was added in place of the water, such that the final concentration of I-1a in the system was 0.8 wt %.

The rheology under oscillatory shear of the resulting example dispersion was then measured as a function of temperature in exactly the same manner as described in Example 1, but over the temperature range 20-45° C.

The complex modulus G* of the resulting example dispersion was plotted as a function of temperature on a linear scale in FIG. 1 and on a logarithmic scale in FIG. 2, and is represented by Curve D in both figures.

Both figures clearly show that the complex modulus, G*, of this example (Curve D) showed a sudden, dramatic increase over a very narrow temperature range as the temperature was increased from 30° C.-40° C. In the linear plot of FIG. 1 it was very noticeable that, once this thermal transition had started, the increase in G* with increasing temperature was both steep and linear.

Figure 3:
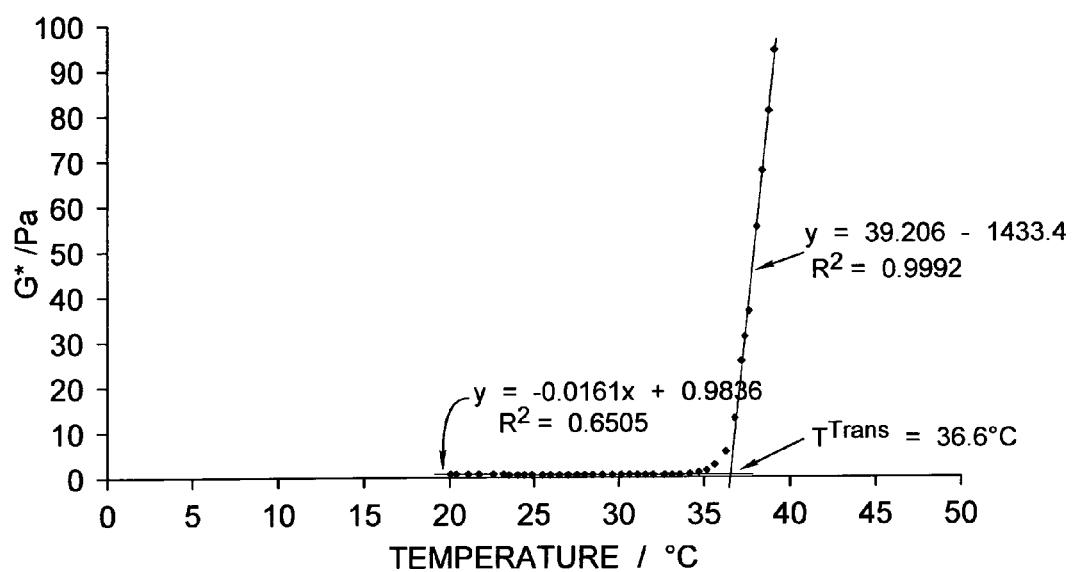
FIG. 3 is a plot of complex modulus (linear scale) as a function of temperature showing the transition temperature defined by the intersection of two best-fit straight lines of the rheological property below and above the transition temperature (dispersant I-1a).

This linear increase in G* provides a very useful means of characterising the temperature of the thermal transition of G*. This is effected by simply establishing the equation of the best-fit straight line to the linear region of the increase in G* and extrapolating the straight line back until it reaches the average low value of G* exhibited over the temperature range before the thermal transition, which can also be represented by a best-fit straight line. The characteristic temperature of the thermal transition of G* is then defined by the intersection of the two straight lines, which can be mathematically determined from the best-fit equations by the standard algebraic method of simultaneous equations. This is pictorially represented in FIG. 3. For this example, the characteristic temperature of the thermal transition temperature, hereinafter $T^{Trans}$, was calculated to be 36.6° C.

As with the linear plot of G* of this example (curve D) in FIG. 1, the logarithmic plot of G* in FIG. 2 (curve D) also showed a steep linear rise with temperature, but only for a 2 to 3° C. range. After that, the logarithmic plot of G* became gradually less steep with further increase in temperature. It was clearly noticeable in the region of greatest change that G* rose approx. two orders of magnitude over the temperature range, 35 to 40° C. If a characteristic temperature were to be chosen from the logarithmic plot to define the thermal transition, then one obvious point might be the temperature at the centre of the linear region of the increase in Log G*. However, as a coincidence, if the characteristic transition temperature parameter, $T^{trans}$, was positioned on the logarithmic plot of G* in FIG. 2 (curve D), it effectively corresponded with the mid-region of the linear part of the plot. Hence $T^{Trans}$ appears to be a very effective parameter for characterising temperature of the thermal transition of G*.

However, it is also useful to define a parameter that relates to the rate of increase in G* with increasing temperature in the thermal transition zone. Given that the increase of G* after the onset of the thermal transition is linear with temperature (FIG. 1), then the slope of the linear region is best suited for characterising this. This parameter is already available from one of the equations of the straight lines used in the determination of the parameter, $T^{Trans}$. The linear rate of increase in G* with increasing temperature in the thermal transition zone is hereinafter defined by $\Delta G^*_{Trans}$ and hence will defined by the units, Pa° C.$^{-1}$. For this example, $\Delta G^*_{Trans}$=39.4 Pa° C.$^{-1}$.

In summary, the presence of the dispersant I-1a in the Control 1 dispersion formulation achieved the objective of the invention. Firstly it reduced the complex modulus of the system relative to the Control 1 dispersion by an order of magnitude at room temperature and thus improved the ease of mixing and fluid transport of the dispersion at ambient conditions, relative to the more viscous Control 1 dispersion, thereby facilitating the manipulation of formulations in manufacturing operations, e.g. such as coating or pouring fluid systems into moulds.

Secondly dispersant I-1a met very effectively the requirement wherein the system is required to thicken up on heating to aid the formation and uniformity of the final required geometry, e.g. for a coating or moulding operation. Its presence in the formulation caused a thermal transition in the stability of the formulation as the temperature was increased. At a characteristic temperature the dispersant destabilised the dispersion and the complex modulus system rose steeply, i.e. by ~2.5 orders of magnitude from 35-45° C. This thermal transition was characterised by a $T^{Trans}$ value of 36.6° C. and rate of increase in complex modulus, defined by $\Delta G^*_{Trans}$=39.4 Pa° C.$^{-1}$. The suddenness and the scale of the rise in complex modulus to values>100 Pa caused the system to lose fluidity and become more solid-like. This behaviour reduces the sensitivity of the formulation system to mechanical perturbations during drying operations (based on heating) and, as such, aids the maintenance of uniformity of products during their final stages of processing, e.g. in post-coating drying or moulding operations.

Example 5

Rheology of Control Dispersion 1+Dispersant I-1a ($2^{nd}$ Run)

The objective of this example was to show the reproducibility of the rheological measurements made in Example 4 with dispersant I-1a by repeating the process. This example was made up from basic components and tested for its rheological properties in exactly the same way as Example 4.

The rheological properties of this example were compared with those of Example 4 using the parameters $T^{Trans}$ and $\Delta G^*_{Trans}$ and the results are presented in TABLE 1 below. The Table shows that the results are reproducible, i.e. the transition temperature was essentially the same in both examples and the rate of rise of the complex modulus in the transition zone was similarly high in both cases.

Example 6

Rheology of Control Dispersion 1+Dispersant I-1a ($3^{rd}$ Run after 6 Days)

The objective of this example was to examine the effect of a long holding time on the rheological measurements made in Example 4. The formulation from Example 4 was held in a sealed container for 6 days before the measurements were made and the rheological properties measured in exactly the same way.

As with Example 5, the rheological properties of this example were compared with those of Example 4 using the parameters $T^{Trans}$ and $\Delta G^*_{Trans}$. The results are presented in TABLE 1 below. The Table shows that holding the samples 6 days before measurement did not influence the rheological results significantly. The transition temperature was essentially the same as that obtained in Examples 4 and 5 and the rate of rise of the complex modulus in the transition zone was similarly high, i.e. ~40 Pa·° C.$^{-1}$. Hence this example demonstrated that the dispersant I-1a produced a dispersion of Catapal™ 200 at ambient conditions that was stable over a period of many days. Owing to its inherent stability, the example also demonstrated the reproducibility of the induced thermal transition when the system was subjected to a controlled rising temperature gradient.

Example 7

Reversibility of Thermal Transition with Dispersant I-1a

Figure 4:
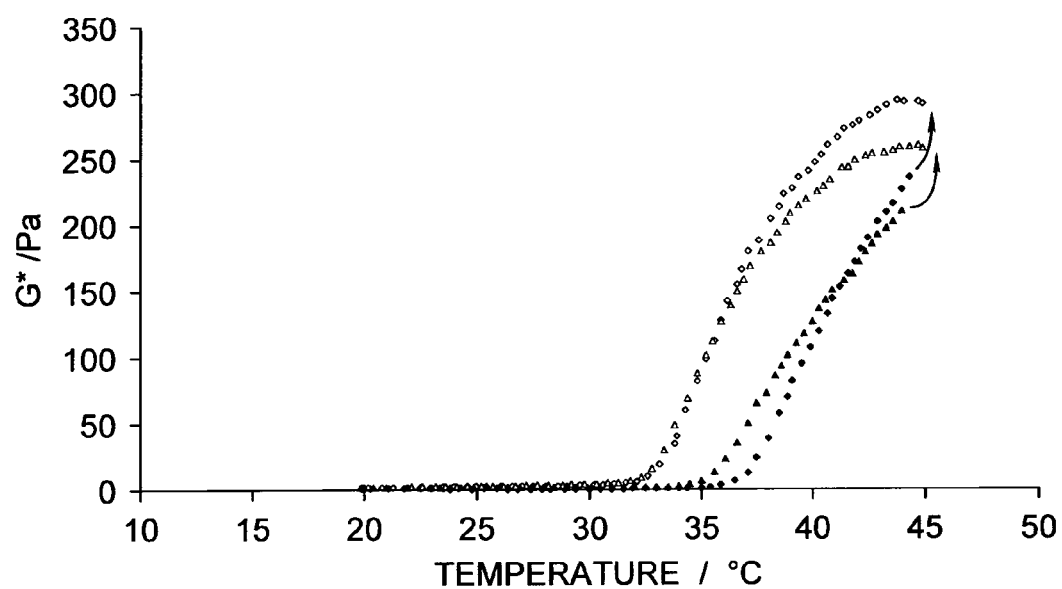
FIG. 4 is a plot of complex modulus (linear scale) as a function of temperature with Control 1+dispersant I-1a, subjected to temperature cycles from 20° C. to 45° C. and back to 20° C., showing reversibility but with some hysteresis. The filled symbols correspond to heating and the open symbols to cooling.

The objective of this example was to test the reversibility of the thermal transition in the complex modulus (G*) with temperature using the formulation described in Example 4, based on dispersant I-1a. The test sample was made up exactly as Example 4 and then the sample was subjected to a temperature cycle from 20° C. to 45° C. and back to 20° C., with a 5 min. hold at the start peak and end temperatures and a temperature gradient of 1° C.·min$^{-1}$. The sample was then subjected to a second temperature cycle using exactly the same conditions. FIG. 4 shows the results obtained, with the G* values of the first cycle denoted by diamonds and of the second cycle by triangles. The first temperature cycle showed that the thermal transition from low G* to high G* was reversible, but with some hysteresis. Thus $T^{Trans}$ for the upward part of the cycle was ~37° C., whereas $T^{Trans}$ for the downward part of the cycle was ~33° C. The $2^{nd}$ temperature cycle also showed a similar degree of reversibility with a similar amount of hysteresis, with a $T^{Trans}$ for the upward part of the cycle of ~35° C. and $T^{Trans}$ for the downward part of the cycle of ~33° C. Although the slope of the upward part of the second was shallower, the downward curve of the $2^{nd}$ cycle overlapped that of the $1^{st}$ cycle. Hence it is concluded that degree of reversibility is very high.

Example 8

Thermal Transition of Control 1 (without PVA)+Dispersant I-1a

The objective of this example was to check the effect of the PVA binder on the thermal transition found in Example 4.

This example was made up exactly as in Example 4, with the exception that water was used in place of the PVA solution. The rheology of the system was then measured exactly as in Example 4.

In the absence of PVA, $T^{Trans}$ was found to be 36.7° C., i.e. essentially the same value as in the presence of PVA (Example 4). The slope of the thermal transition region, $\Delta G^*_{Trans}$, was found to be 31.7 Pa·° C.$^{-1}$. Although this was significantly less than that found in the presence of PVA (Example 4), it was nonetheless a large gradient. Hence this example demonstrated well that a thermally-responsive dispersant of this invention will give a steep thermal transition in an aqueous Catapal™ 200 dispersion in the absence of a binder.

Example 9

Rheology of Control Dispersion 1+Dispersant I-1b

The objective of this example was to test a dispersant of the invention which possessed a different average number of monomer units from I-1a, in order to test the sensitivity of the rheological results to such a change in structure. I-1b possesses the same anchor group as I-1a, but possesses 20 N-isopropylacrylamide units instead of 25 units.

Figure 5:
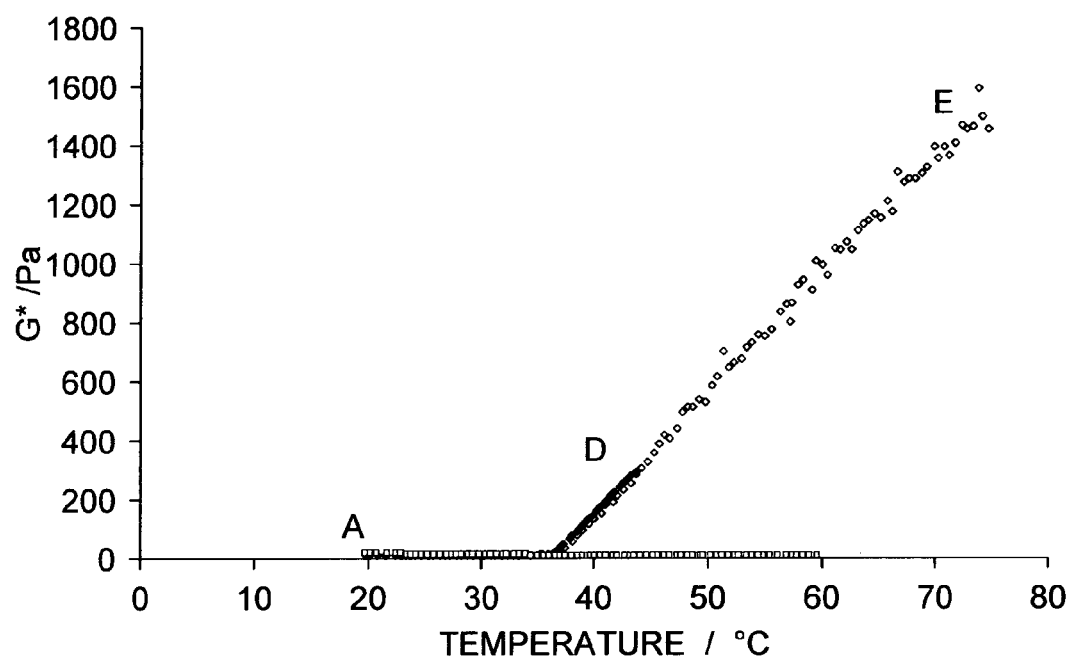
FIG. 5 shows a plot of complex modulus (linear scale) of Control 1 alone, (Curve A), Control 1+dispersant I-1a (Curve D) and Control 1+dispersant I-1b (Curve E) as a function of temperature.

This experiment was conducted exactly as in Example 4 with the exception that I-1b was substituted in place of I-1a and the temperature range of the rheological measurements was extended to 75° C. FIG. 5 shows a linear plot of the complex modulus (G*) of the final formulation as a function of temperature (curve E), together with the corresponding data from dispersant I-1a in Example 4 (curve D).

This figure shows clearly that the thermal transitions of the two dispersions with I-1a and I-1b are essentially the same and possess the same rate of rise, i.e. they possess similar values of $T^{Trans}$ and $\Delta G^*_{Trans}$. The values relating to the current example are presented in TABLE 1 for comparison with other data. The rise in G* was remarkably found to be approx. linear over the whole of the extended temperature range, suggesting that further heating would encourage further solid-like behaviour of the dispersion. The rheological data are also produced in logarithmic form in FIG. 2 for comparison with other data. The logarithmic data show that using dispersant I-1b the starting point is a higher value of G* than Example 4 (with I-1a) at ambient temperature. However, these two sets of data overlay once linear part of the thermal transition is reached. The above comparative data suggest that the thermal behaviour is not particularly sensitive to the length of the polymeric stabiliser (poly-NIPAM) of the dispersant.

Overall, this example provides further supporting data to the fact that the thermal behaviour induced by the dispersants of the invention increase the viscosity/rigidity of a disperse system on heating, in turn reducing the sensitivity of the formulation system to mechanical perturbations during drying operations (based on heating), and as such would aid the maintenance of uniformity of products during their final stages of processing, e.g. in post-coating drying or moulding operations.

Example 10

Rheology of Control Dispersion 1+Dispersant I-5a

The previous examples have investigated the use of dispersants of the invention in which the polymeric stabilising group is a homopolymer of N-isopropyl-acrylamide. These structures are appropriate if a temperature of onset of the thermal transition in rheology of ~35° C. is required. However the thermal transition zone can be raised to higher or lower temperatures by adjusting the structure of the thermally-responsive polymeric stabilising part of the dispersant, such that the thermal transition in rheology can be manipulated over a range of temperatures to suit different formulations, processes or products. Effectively this adjustment involves a random 'dilution' of the thermally-responsive polymeric stabilising block with a non-thermally-responsive hydrophilic co-monomer.

In this example this was achieved by using the dispersant I-5a, which was prepared by using a mixture of two monomers in the random polymerisation part of its synthesis, namely the highly thermally-responsive monomer N-isopropyl-acrylamide and the non-thermally-responsive monomer acrylamide. The average structure of the random polymeric stabilising block comprised 22 monomer units of N-isopropylacrylamide and 4 monomer units of acrylamide.

This example was made up exactly as Example 1, with the exception that an aqueous solution of the dispersant I-5a was added in place of the water, such that the final concentration of I-5a in the system was 0.8 wt %.

The rheology under oscillatory shear of the resulting example dispersion was then measured as a function of temperature exactly as described in Example 1, but over the extended temperature range 20-65° C., to allow for an increase in the thermal transition temperature. Two measurement runs were made on separate samples.

The complex modulus G* of the first measurement run was plotted as a function of temperature on a linear scale in FIG. 1 and on a logarithmic scale in FIG. 2, and is represented by Curve F in both figures. Both figures demonstrate clearly that the dispersant of the invention I-5a caused the thermal transition zone to be significantly raised in temperature, without losing much of the steepness of the thermal transition. This is characterised by a $T^{Trans}$ value of 55.1° C., which represents an 18.5° C. rise for the thermal transition zone relative to that obtained with dispersant I-1a (Example 4), and a $\Delta G^*_{Trans}$ value of 15.5 Pa·° C.$^{-1}$, which represents a rate of rise in G* with temperature that is 39% of the value obtained with dispersant I-1a. This rate of rise is still significantly steep with G* rising by two orders of magnitude over the temperature range, 50-60° C.

The rheological data from the second measurement run, with $T^{Trans}$=55.0° C. and $\Delta G^*_{Trans}$=16.0 Pa·° C.$^{-1}$, was in close agreement with that from the first measurement run, thus demonstrating the reproducibility of the rheological data. The above characteristic values from both measurement runs are recorded in TABLE 1 to aid comparison with the other examples.

In summary this example shows that the structure of the dispersants of the invention can be manipulated to increase (or analogously to decrease) the temperature of their thermal transition properties by diluting the thermally-responsive polymeric stabilising part of the dispersant with a hydrophilic non-thermally-responsive co-monomer that is randomly distributed due to nature of the mixed monomer polymerisation process used in their synthesis. It also demonstrates that the dilution of thermally-responsive polymeric stabilising group of the dispersant with non-thermally-responsive co-monomer units does not dramatically alter the overall magnitude of the increase in G* with temperature, relative to a similarly structured 'non-diluted' dispersant such as I-1a (Example 4), the polymeric stabilising group of which comprises 100% thermally-responsive monomer units (see FIG. 2, curve F versus curve D respectively).

The above properties would permit the manipulation of formulation systems that require to be processed at higher temperatures, whilst maintaining the benefits of a thermal transition when the temperature were raised above the critical temperature at the onset of the transition, reducing the sensitivity of the formulation system to mechanical perturbations during drying operations.

Example 11

Rheology of Control Dispersion 1+Dispersant I-6a

As with Example 10, this example demonstrates that the thermal transition zone can be raised to higher temperatures by adjusting the structure of the thermally-responsive polymeric stabilising part of the dispersant. As with the previous example, this adjustment involved a random 'dilution' of the thermally-responsive polymeric stabilising block with a hydrophilic co-monomer that was non-thermally-responsive. In this example this was achieved by using the dispersant I-6a, prepared from a mixture of two monomers in the random polymerisation part of its synthesis, namely the thermally-responsive monomer, N-isopropylacrylamide, and the non-thermally-responsive monomer, N,N-dimethylacrylamide. The average structure of the random copolymeric stabilising block comprised 10 monomer units of N-iso-propylacrylamide and 10 monomer units of acrylamide.

This example was made up as Example 1, but with the exception that an aqueous solution of the dispersant I-6a was added in place of the water, such that the final concentration of I-6a in the system was 1.6 wt %.

The rheology under oscillatory shear of the resulting example dispersion was then measured as a function of temperature exactly as described in Example 1, but over the extended temperature range 20-75° C. to allow for a further increase in thermal transition temperature. (75° C. was considered to be the upper limit for making measurements with the rheometer).

The complex modulus G* was plotted as a function of temperature on a linear scale in FIG. 1 and on a logarithmic scale in FIG. 2, and is represented by Curve G in both figures. Both figures demonstrate clearly that the dispersant I-6a caused the thermal transition zone to be significantly raised in temperature without losing much of the steepness of the thermal transition. This was characterised by a $T^{Trans}$ value of 66.8° C., representing a 30.2° C. rise for the thermal transition zone, relative to that obtained with dispersant I-1a (Example 4), and an 11.7° C. rise with respect to that obtained by the dispersant I-5a (Example 10). The rate of rise of G* in the linear part of the transition zone, $\Delta G^*_{Trans}$ was found to be 14.1 Pa·° C.$^{-1}$, representing a rate of rise in G* with temperature that is 36% of the value obtained with dispersant I-1a. This rate of rise is still significantly steep with G*, rising by two orders of magnitude over the temperature range, 60-70° C. These characteristic rheometric parameters are recorded in TABLE 1 for comparison with other examples.

In summary, this example reinforces the result obtained in the previous example, that the structure of the dispersants of the invention can be manipulated to increase (or analogously to decrease) the temperature of their thermal transition properties by diluting the thermally-responsive polymeric stabilising part of the dispersant with a hydrophilic non-thermally-responsive co-monomer that is randomly distributed due to nature of the mixed monomer polymerisation process used in their synthesis. It also reinforces the finding therein that the dilution of a thermally-responsive polymeric stabilising group of the dispersant with a non-thermally-responsive co-monomer unit does not dramatically alter the overall magnitude of the increase in G* with temperature, relative to a similarly structured 'non-diluted' dispersant such as I-1a (Example 4) whose polymeric stabilising group comprises 100% thermally-responsive monomer units (see FIG. 2, curve G v. curve D respectively).

From the results of this example and Example 10, representing a random 'dilution' of the thermally-responsive polymeric part of the structure of a dispersant of the invention with non-thermally-responsive hydrophilic monomers, the following two points are suggested.

1. Any soluble, non-thermally-responsive, hydrophilic monomer units will probably achieve the same result of raising (or in some cases lowering) the temperature of the thermal transition zone.
2. The characteristic temperature of thermal transition zone associated with the copolymer systems is likely to increase, or correspondingly decrease, with increasing 'dilution' of the thermally sensitive polymer, i.e. increase in the number of non-thermally-responsive hydrophilic monomer units. Hence although acrylamide and N,N-dimethylacrylamide may not have the same impact per unit monomer, it is nevertheless unsurprising that I-6a with its 10:10 dilution (average number of non-thermally-responsive monomer units: thermally-responsive monomer units) led to a higher thermal transition temperature than that of I-5a with its lower average dilution factor of 4:22.

As with Example 10, the properties of this example permit the manipulation of formulation systems that require to be processed at higher temperatures, whilst maintaining the benefits of a thermal transition when the temperature is raised above the critical temperature at the onset of the transition.

Example 12

Rheology of Control Dispersion 1 without PVA
(37.0% Catapal™ 200 in Water)+Comparison
Dispersant C4

Figure 6:
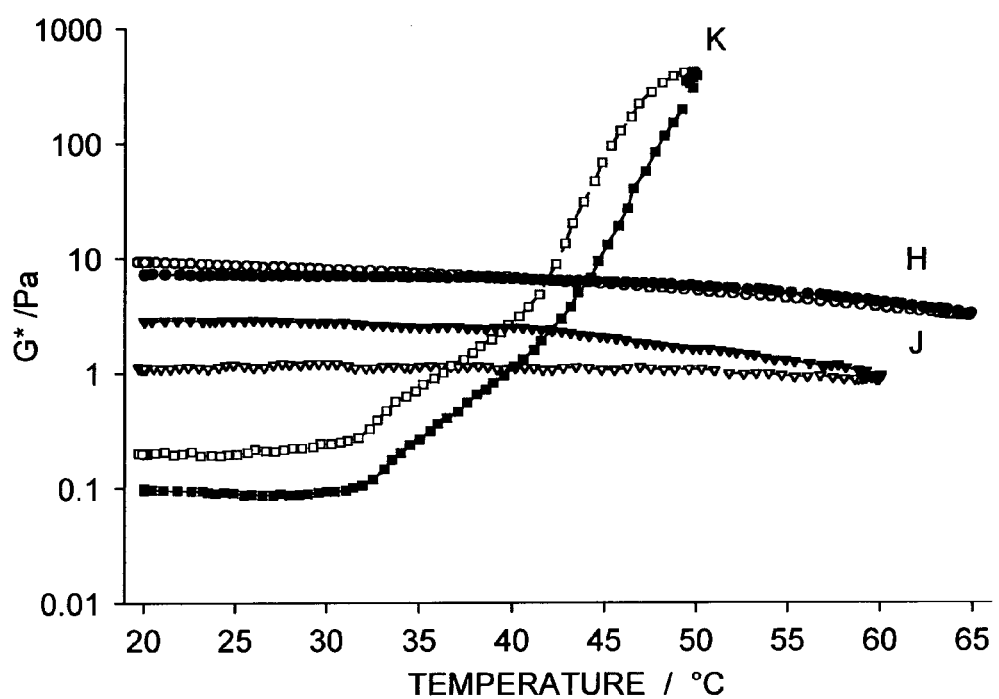
FIG. 6 shows a plot of complex modulus (logarithmic scale) versus temperature of the upward sweep of viscosity of Control 1 without PVA (Curve H), Control 1+comparison dispersant C4 (Curve J) and Control 1+dispersant I-69a (Curve K). The filled symbols correspond to heating and the open symbols to cooling.

In this experiment, the Control 1 sample was made without the polymeric binder PVA. The rheology under oscillatory shear of this dispersion was then measured as a function of temperature exactly as described in Example 7 but over the temperature range 20° C. to 65° and back to 20° C. The complex modulus was lower than in the presence of PVA. The complex modulus fell as the temperature increased and increased again as the temperature fell, as shown in FIG. 6 (Curve H).

The Control 1 sample was also prepared with 1.6% w/w of the comparison dispersant C4. The rheology under oscillatory shear of this dispersion was then measured as a function of temperature exactly as described in Example 7 but over the temperature range 20° C. to 65° and back to 20° C. The complex modulus was lowered by the presence of C4 but the complex modulus only fell as the temperature was increased. There was little change in complex modulus on cooling (Curve J). The comparison dispersant C4 therefore has no measurable effects for thickening the dispersion on heating.

Figure 7:
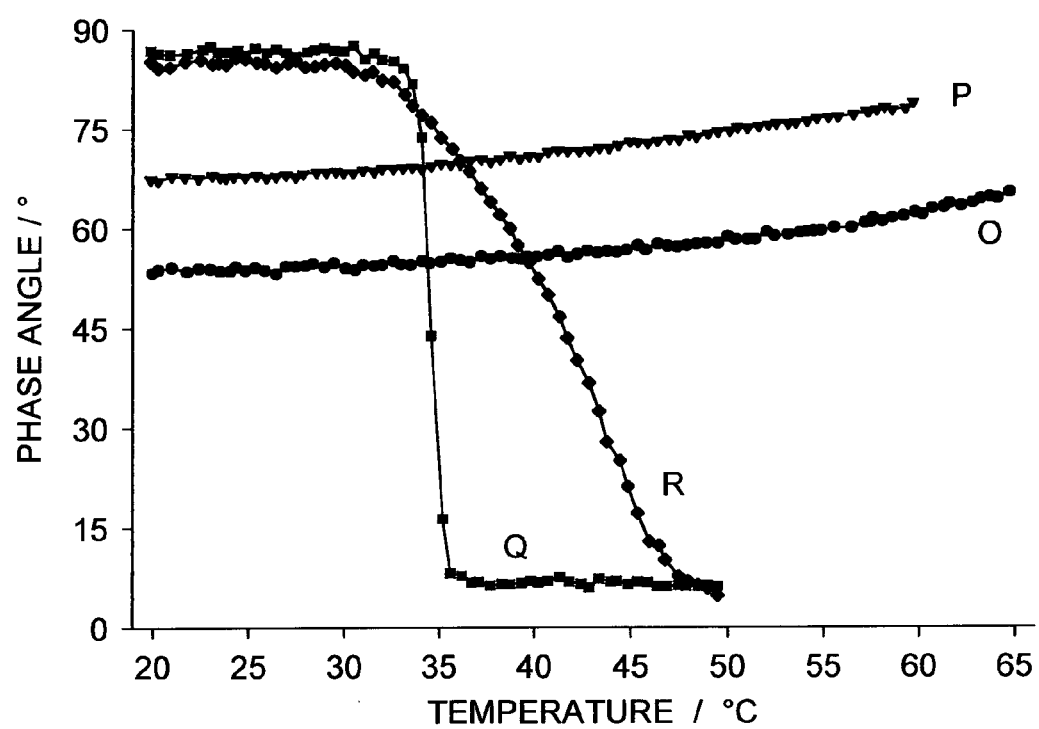
FIG. 7 shows a plot of phase angle versus temperature of the upward sweep of viscosity of Control 1 without PVA (Curve O), Control 1+comparison dispersant C4 (Curve P), Control 1+dispersant I-1a (Curve Q) and Control 1+dispersant I-69a (Curve R).

The phase angle describes the difference in phase between the stress and strain in the oscillatory shear experiment, a value of 90° corresponding to purely viscous behaviour, whilst 0° corresponding to purely elastic behaviour. The values of phase angle determined during the temperature sweep measurements are shown in FIG. 7. The suspension with no dispersant (Curve O) and that with comparison dispersant C4 (Curve P) both showed increases in phase angle with temperature, indicating that the suspension was becoming relatively more fluid on increasing temperature.

Example 13

Rheology of Control Dispersion 1 without PVA
(37.0% Catapal™ 200 in Water+Dispersant I-69a A sample of Control 1 plus 1.6% dispersant I-69a was prepared. This dispersant has a sulfonic acid anchor group, in contrast to the carboxylic acid anchor used in Examples I-1a, I-1b, I-5a and I-6a. The dispersion in this example had the same solid particle content as those in Example 12. The complex modulus was recorded at low oscillatory amplitude over the temperature range 20° C. to 50° and back to 20° C. and the results are shown in FIG. 6 (Curve K) alongside those for Example 12 for the control (Curve H) and with comparison dispersant C4 (Curve J).

The dispersion containing I-69a had a much lower complex modulus at 20° C. (by a factor of 30 to 100) than the control or comparison dispersant C4. On heating the dispersion with I-69a, the value of the complex modulus first fell but then increased. By 45° C., the complex modulus of the dispersion with I-69a was greater than that with no dispersant or with the comparison dispersant C4. The increase in modulus first became significant from 32° C. but the growth with temperature was more gradual than with the carboxylic dispersants, up to 40-45° C., after which the rise in modulus with temperature was sharp. On a linearly scaled plot to a complex modulus of approximately 100 Pa (as in FIG. 3), the values of $T^{Trans}$ and $\Delta G^*_{Trans}$ were 45.8° C., and 42.1° C.·Pa$^{-1}$ respectively.

The change from fluid-like to solid-like behaviour of the suspensions in the presence of the thermally-responsive dispersants I-Ia and I-69a may be seen in the change in the phase angle with temperature as shown in FIG. 7. Both a suspension with 1.6% dispersant I-1a (Curve Q) and a suspension with 1.6% dispersant I-69a (Curve R) had a higher phase angle at low temperatures than the Control 1 (Curve O) and dispersion with comparison dispersant C4 (Curve P) in Example 12. However, these suspensions turned rapidly from viscous to elastic, passing the phase angle of 45° (where the viscous and elastic responses are equal) at 34.5° C. for dispersant I-1a. The suspension containing the sulfonic acid dispersant I-69a (Curve R) showed a more gradual reduction in phase angle, with the value of 45° being achieved at 41.5° C. for the dispersant sample. By 50° C., both curves Q and R had achieved phase angles below 10° so describing solid or elastic material properties, rather than the liquid or viscous properties exhibited below 30° C.

Thus in the case of both thermally-responsive dispersants I-1a and I-69a, there was a transition from viscous to elastic behaviour of the suspensions on heating, and the change was reversed on cooling (see, for example Curve K for dispersant I-69a in FIG. 6). Thus, the presence of a thermally-responsive dispersant enables the suspension to be gelled or rigidified on heating. In the absence of dispersant or in the presence of the comparison dispersant C4, the suspension becomes more fluid-like on heating, as expected from the continuing fall in the value of the complex modulus.

Example 14

Rheology of Control 2 (41.6% Catapal™ 200 in Water without PVA)

The objective of this example was to provide a control of higher Catapal™ 200 content, in the absence of binder, that possessed a much higher viscosity than the previous examples. This example was prepared as for Example 1 but with the elimination of the step relating to the addition of PVA solution, providing an aqueous dispersion containing 41.6 wt % Catapal™ 200.

The rheology under oscillatory shear of the resulting dispersion was then measured as a function of temperature exactly as described in Example 1 over the temperature range 20-45° C.

The resulting dispersion was a very viscoelastic paste characterised by a high complex modulus value (>100 Pa) over the entire temperature range. In mathematical terms, the complex modulus G* varied in a near linear fashion changing from ~164 Pa at 20° C. to ~114 Pa at 45° C. with a gradient of approx. $-2$ Pa·° C.$^{-1}$.

The highly viscous nature of the Control 2 system over the temperature range 20-45° C. would make it difficult to process the formulation at ambient or near ambient conditions (e.g. mixing, pouring and fluid transport).

Example 15

Rheology of Control 2+Dispersant I-1a

The objective of this example was twofold: firstly to test the capability of the dispersant to reduce the viscosity of a more viscous dispersion with a higher concentration of solids, i.e. Control 2, and secondly to test the thermal transition properties of this dispersion in the presence of the thermally-responsive dispersant I-1a.

This example was made up as for Example 14 with the exception that the water component was replaced with an aqueous solution of the dispersant I-1a, such that the final concentration of the dispersant in the system was 0.9 wt %.

The rheology under oscillatory shear of the resulting dispersion was then measured as a function of temperature exactly as described in Example 1 over the temperature range 20-45° C.

The complex modulus (G*) of the Control 2 dispersion in the presence of 0.9 wt % I-1a was found to vary from 23-21 Pa over the temperature range 20-32° C., which was much lower than the average value of around 150 Pa for the Control 2 system (Example 14) over the same temperature range. This demonstrates the capability of the dispersant I-1a to reduce viscosity at ambient and near ambient conditions. As the temperature was increased towards 35° C., G* started to increase dramatically in value, the rise becoming linear within a few ° C. until G* reached 567 Pa at 45° C., i.e. the same type of thermal transition behaviour in G* as seen with I-1a in Example 4.

The data were analysed as in previous examples to yield the following characteristic parameters of the thermal transition, $T^{Trans}=34.6°$ C. and $\Delta G^*_{Trans}=54.5$ Pa·° C.$^{-1}$. Compared with the previous examples based on the lower solids content of Control 1 (37% Catapal™ 200), $T^{Trans}$ was of similar value, but had decreased by 2° C., and $\Delta G^*_{Trans}$ had increased by ~15 Pa. It appears therefore that the higher solids content might cause the system to be more sensitive to temperature. These parameters are recorded in TABLE 1 for comparison with other examples.

Overall, this example provides further supporting data to the fact that the thermal behaviour induced by the dispersants of the invention will increase the viscosity/rigidity of a disperse system on heating, which in turn will reduce the sensitivity of the formulation system to mechanical perturbations during drying operations (based on heating), and as such would aid the maintenance of uniformity of products during their final stages of processing, e.g. in post-coating drying or moulding operations.

Example 16

Rheology of Control 2+Dispersant I-5a

The objective of this example was as for Example 15, using however dispersant I-5a.

This example was made up as for Example 14, with the exception that the water component was replaced with an aqueous solution of the dispersant I-5a, such that the final concentration of the dispersant in the system was 0.9 wt %.

The rheology under oscillatory shear of the resulting dispersion was then measured as a function of temperature as described in Example 1, but over the higher temperature range of 20-60° C. to allow for the higher thermal transition temperature of I-5a (see Example 10).

The complex modulus (G*) of the Control 2 dispersion in the presence of 0.9 wt % I-5a was found to be 24±0.5 Pa over the temperature range 20-40° C., which was much lower than the average value of around 150 Pa for the Control 2 system (Example 14) over the same temperature range. This demonstrates the capability of the dispersant I-5a to reduce viscosity at ambient and near ambient conditions. As the temperature was increased through the range 45-50° C., G* started to increase gradually in value. However as the temperature was increased through the temperature range 50-53° C., G* started to rise dramatically, the rise becoming linear from 54° C. onwards until G* reached 252 Pa at 59.8° C., i.e. the same type of thermal transition behaviour in G* as seen with I-5a and Control 1 in Example 10.

The data was analysed as in previous examples to yield the following characteristic parameters of the thermal transition, $T^{Trans}=51.8°$ C. and $\Delta G^*_{Trans}=28.0$ Pa·° C.$^{-1}$. As with the previous example, the higher solids content (relative to earlier examples containing less Catapal™ 200) appeared to cause the $T^{Trans}$ to be a few degrees lower and $\Delta G^*_{Trans}$ to be significantly higher, i.e. a higher sensitivity to temperature. These parameters are recorded in TABLE 1 for comparison with other examples.

Overall, this example provides further supporting data to the fact that the thermal behaviour induced by the dispersants of the invention will increase the viscosity/rigidity of a disperse system on heating, which in turn would reduce the sensitivity of the formulation system to mechanical perturbations during drying operations (based on heating)

Example 17

Rheology of Control 3 (30 Wt % ZnO in Water without PVA)

The objective of this example was to introduce and characterise another positively-charged particulate system that could be used to test the general efficacy of the dispersants of the invention designed for such charged systems.

5.00 g of zinc oxide (Aldrich, Cat. No. 20, 553-2, powder, <1 μm, 99.9% ZnO) were weighed out into a glass vial, 11.67 g millipore-purified water added, the vial sealed and the resulting dispersion stirred at room temperature in its sealed container. The final composition on a w/w basis was: 30% ZnO, 70% water. The sample was then left standing overnight and then stirred again in readiness for rheological measurements. The final fluid behaved as a gel-like solid paste.

The rheology under oscillatory shear of the resulting dispersion was then measured as a function of temperature over the temperature range, 20-40° C., in exactly the same manner as described in Example 1.

The complex modulus (G*) at room temperature was found to be extremely high, i.e. 5400 Pa at 20° C., which was consistent with its stiff, gel-like nature. The complex modulus decreased fairly linearly over the temperature range, reaching a value of ~1100 Pa at 40° C., which translates to a negative gradient of 215 Pa·° C.$^{-1}$. Hence there was no evidence of a thermal transition in rheological properties over this range. A G* value of 1100 still represents a very viscous, gel-like fluid.

Example 18

Rheology of Control 3+0.8% Dispersant I-1a without PVA

The objective of this example was to take another positively-charged particulate system, in this case the 30 wt % zinc oxide system introduced in Example 17 above, and test the general efficacy of a dispersant of the invention designed for such a charged system, in this case the dispersant I-1a.

Example 18 was prepared in exactly the same way as Example 17 with the exception that a solution I-1a in water was added in place of the water, such that the final concentration of I-1a in the system was 0.8 wt %. The sample was then left standing overnight and then stirred again in readiness for rheological measurements. The final system behaved as a very mobile fluid, which was markedly different from the viscous paste found with the Control 3 dispersion in the absence of dispersant (Example 17).

The rheology under oscillatory shear of the resulting dispersion was then measured as a function of temperature over the temperature range, 20-40° C., in exactly the same manner as described in Example 1.

The complex modulus (G*) was found to be extremely low relative to the no dispersant case (Control 3 in Example 17) over the temperature range, 20-30° C., i.e. ~0.01 Pa versus an average of 4000 Pa, which represents a value that is over five orders of magnitude lower in value. This demonstrates the high effectiveness of this dispersant for aqueous zinc oxide dispersions at ambient conditions. However, as the temperature was increased from 30-40° C. a strong thermal transition was found in G*, similar to the result obtained with I-1a in the Control 1 dispersion in Example 4. From 30-36° C. there was a steady increase in the rate of rise of G* with temperature with G* reaching ~0.04 Pa at 33° C. and ~100 Pa at 36° C. From 36° C. onwards the rate of rise in G* became constant as with previous examples with I-1a, showing a strong consistency of behaviour.

Hence as with previous examples, this example can be characterised by $T^{Trans}$ and $\Delta G^*_{Trans}$ values, which were found to be 35.4° C. and 113.84 Pa·° C.$^{-1}$ respectively (these values are recorded in TABLE 1 for comparison with other examples). The $T^{Trans}$ value lies between those measured with dispersant I-1a in the Control 1 and Control 2 dispersions (Examples 4 & 15 respectively), thus demonstrating that the thermal transition initiates at a similar temperature for all the dispersion examples containing the dispersant of the invention I-1a. However, this example possesses a $\Delta G^*_{Trans}$ value that is almost three times those found in the examples based on the Control 1 dispersion, thus demonstrating that the 30 wt % zinc oxide dispersion in water possesses a much higher thermal sensitivity than the 37 wt % Catapal™ 200 (boehmite) in water.

In summary, this example demonstrates the general efficacy of the dispersants of the invention designed for positively-charged systems insofar as it will cause a thermal transition in the rheology of other positively-charged oxide systems with increasing temperature, in this case an aqueous dispersion of zinc oxide. The example also provides further supporting data to the fact that the thermal behaviour induced by the dispersants of the invention would increase the viscosity/rigidity of a disperse system on heating, which in turn would reduce the sensitivity of the formulation system to mechanical perturbations during drying operations (based on heating), and as such would aid the maintenance of uniformity of products during their final stages of processing, e.g. in post-coating drying or moulding operations.

Example 19

Rheology of Control 4 (12% Aerosil™ 200 in Water)

The objective of this example was to introduce and characterise a negatively-charged particulate system, in this case 12 wt % Aerosil™ 200 in water, which can be used to test the general efficacy of the thermally-responsive dispersants of the invention designed for negatively-charged dispersions.

Fumed silica Aerosil™ 200 was suspended to 12 wt % in water. The suspensions were held overnight to disperse. Rheological measurements were then made with a Bohlin CS50 rheometer with a C2.3/26 bob and cup geometry.

Initially three stress sweeps in oscillation ("up and down") were performed to determine the yield stress for the freshly loaded sample at 20° C. Oscillatory measurements were performed at a constant frequency of 1 rad·s−1 and the complex modulus (=stress/strain) was monitored as a function of applied stress.

A shear rate sweep in viscosity was then run with increasing and decreasing rate and repeated. The first "up" sweep was usually found to have a higher viscosity than subsequent runs indicating that the sample was broken down or better dispersed for the subsequent runs. After the first "up" sweep, "up and down" sweeps were very similar, suggesting that the structure broken down by the stress rebuilds rapidly. A second series of "up and down" stress sweep in oscillation was finally performed to determine the yield stress of the material once exposed to high shear (dispersed). To avoid unnecessary confusion, the "up" sweep curve data was used for comparison and differentiation between systems. To simplify matters further, the complex modulus at 0.1 Pa oscillatory stress, $CM^{0.1}$, was recorded from the "up" sweep curve data as a single value parameter to characterize the system for the purpose of comparison and differentiation between systems.

A temperature profile in oscillation, with the stress controlled so as to give a strain of 0.003, was then applied. The temperature profile was 120 s at 20° C., increase from 20 to 60° C. at 1 C·min$^{-1}$ with a hold at 60° C. for 300 s.

In order to make single parameter comparisons it was useful to compare values of G* at the following holding points:
1. 20° C. hold before the temperature rise
2. 60° C. hold at the upper limit of the temperature rise.
As stated earlier such an approach provides a single value parameter for differentiating the rheological nature at different parts of the thermal treatment.

Figure 8:
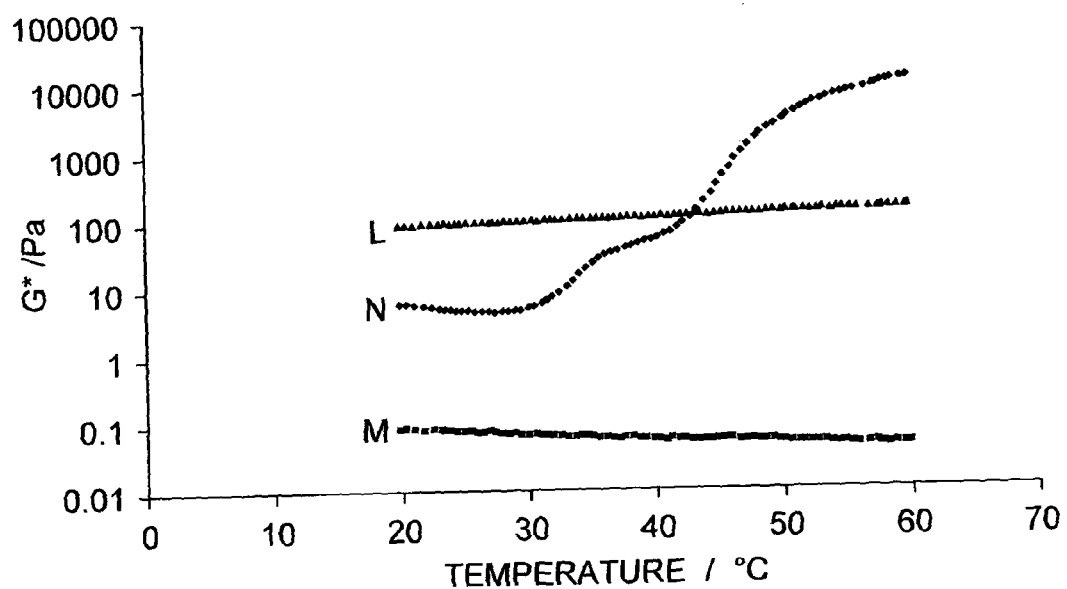
FIG. 8 shows the complex modulus (logarithmically scaled) versus temperature of the upward sweep of viscosity of Control 4 (Curve L), Control 4+comparison dispersant C3 (Curve M) and Control 4+dispersant I-19a (Curve N).

The complex modulus (G*) data in oscillation at controlled stress was plotted logarithmically for the upward sweep in temperature in FIG. 8 and is represented by curve L. The curve has a shallow upward slope with a G* value of the order of 100 Pa, consistent with a gel-like system. The average values of G* for the holding points at 20° C. and at the upper limit at 60° C. were found to be 79 and 141 Pa respectively: these are recorded in TABLE 2 for comparison with other results. This represents a gel-like system of low mobility, which would be difficult to pour and manipulate without the aid of a dispersant.

Example 20

Rheology of Control 4+Comparison Dispersant C-3

The objective of this example was to test the efficacy of the comparison dispersant C3, which is designed for use in negatively-charged particulate systems rather than positively-charged ones but does not possess a strong desolvation in water in the temperature range investigated (ambient to 75° C.). In this case the Control 4 formulation (12 wt % Aerosil™ 200 in water), which was described in Example 19, was used as a representative negatively-charged particulate test system.

This example was prepared in exactly the same way as in Example 19 with the exception that an aqueous solution of comparison dispersant C3 was used in place of water, such that the final concentration of dispersant in the system was 5 wt % and the final concentration of Aerosil™ 200 was 12 wt %, a reasonably large loading of dispersant being needed due to the high surface area of Aerosil™ 200. The rheology (complex modulus, G*) under oscillatory shear of the resulting dispersion was then measured as a function of temperature over the temperature range, 20-60° C., exactly as described in Example 19. Also as with the preceding example, G* values were recorded at the holding temperatures at the beginning (20° C.) and end (60° C.) of the temperature profile.

The complex modulus (G*) of the upward sweep was plotted as a function of temperature in FIG. 8, represented by curve M. The value of the comparison material C3 as a dispersant is clearly evident as it lowers the complex modulus of the parent system (Control 4—curve L) by about three orders of magnitude, thus enabling much better fluid management. The G* values at the beginning and end of the temperature profile of 0.083 and 0.045, which compare with 79 and 141 for the Control 4 dispersion in the absence of dispersant, endorse the above differential (these values are recorded in TABLE 2 for comparison with other examples).

However, the increased fluidity of the current example, plus the increasing fluidity with increasing temperature, makes the formulation even more prone to mechanical perturbations during a drying process based on heating until evaporative losses decrease the fluidity, for example in post-coating drying or moulding operations. Unlike materials for use in the invention, there is no useful thermal response in the system that would aid the immobilisation, setting or fixing of the system.

Example 21

Rheology of Control 4+Dispersant I-19a

The objective of this example was to test the efficacy of a dispersant of the invention which is designed to produce a strong thermal response in the rheology of a negatively-charged particulate system (by a process of desolvation). In this case, the Control 4 formulation (12 wt % Aerosil™ 200 in water), which was described in Example 19, was used as a representative negatively-charged particulate test system.

The current example was prepared exactly as for Example 19 with the exception that an aqueous solution of dispersant I-19a was used in place of water, such that the final concentration of dispersant in the system was 5 wt % and the final concentration of Aerosil™ 200 was 12 wt %. The rheology (complex modulus, G*) under oscillatory shear of the resulting dispersion was then measured as a function of temperature over the temperature range, 20-60° C., exactly as described in Example 19. Also as in Examples 19 and 20, G* values were recorded at the holding temperatures at the beginning (20° C.) and end (60° C.) of the temperature profile: the values are recorded in TABLE 2 for comparison with other examples.

The complex modulus (G*) of the upward sweep was plotted as a function of temperature in FIG. 8, represented by curve N. The character of the dispersant of the invention I-19a is clearly apparent, lowering the complex modulus of the base system without dispersant represented by curve L at ambient temperatures up to 30° C., thus enabling easier manipulation of the resulting dispersion under ambient conditions. However, when the dispersion was heated beyond 30° C., the desolvation of the dispersant brought about a dramatic increase in G* with increasing temperature, G* rising by three orders of magnitude over the temperature range 30-60° C. Although the logarithmic plot in FIG. 8 has a wave in the G* data, a linear plot of the G* data (not shown here) shows that the data become linear with temperature once G* exceeds 2000 Pa. Applying the analysis used in the earlier examples this translates to a $T^{Trans}$ value of 46.5° C. and $\Delta G_{Trans}$ value of 782 Pa·° C.$^{-1}$, the latter rate being approximately an order of magnitude larger than any of the earlier examples.

TABLE 2 shows the values of G* during the temperature holds at 20° C. and 60° C. of the temperature profile and compares them with the Control 4 dispersion without dispersant (Example 19) and the Control 4 dispersion in the presence of a comparison dispersant C3 that is non-thermally-responsive (Example 20). The data in the table support the data in FIG. 8, showing that the dispersant of the invention I-19a lowers the complex modulus of the base Control 4 system without dispersant at 20° C., thus enabling easier manipulation of the resulting dispersion under ambient conditions, though it is not as effective as the prior art dispersant, C3, in this respect. However, the data at the 60° C. holding temperature show that the dispersant I-19a raises the complex modulus (G*) of the system by almost three orders of magnitude with respect to the initial value, thus showing an effective immobilisation of the system. In contrast, the basic Control 4 system (Example 19) only showed a fractional increase in G* and the Control 4 system with comparison dispersant C3 (Example 20) maintained a very low value of G* and thus a very high mobility.

Hence this example clearly demonstrates that a dispersant of the invention can produce the desired properties in a negatively-charged particulate system, insofar as it is able to reduce the viscosity (complex modulus, G*) of the parent particulate dispersion at ambient conditions and so improve the processing of the formulation at low temperatures and yet can immobilise the system rapidly with increasing the temperature by enabling a rapid rise in G*, thus reducing the sensitivity of the formulation to mechanical perturbations during a drying process based on heating. Example applications are control of formulation uniformity during post-coating drying or moulding operations.

TABLE 1

Rheological Properties of Dispersants of the Invention in Control Dispersions

| Example | $T^{Trans}$ ° C. | $\Delta G^*_{Trans}/$ Pa · ° C.$^{-1}$ |
|---|---|---|
| Example 4 Control 1 + I-1a (1$^{st}$ run) | 36.6 | 39.4 |
| Example 5 Control 1 + I-1a (2$^{nd}$ run) | 36.7 | 36.8 |
| Example 6 Control 1 + I-1a (3$^{rd}$ run - after 6 days) | 36.6 | 40.96 |
| Example 8 Control 1 + I-1a (no PVA) | 36.7 | 31.7 |
| Example 9 Control 1 + I-1b | 36.8 | 40.6 |
| Example 10 Control 1 + I-5a Run 1/Run 2 (dilution 22:4 poly-NIPAM:polyacrylamide) | 55.1/55.0 | 15.5/16.0 |
| Example 11 Control 1 + I-6a (dilution 10:10 poly-NIPAM:N,N-dimethylacrylamide) | 66.8 | 14.1 |
| Example 13 Control 1 + I-69a, 37.0% Catapal 1.6% mercaptosulfonic acid (NIPAM 25) (no PVA) | 45.8 | 42.1 |
| Example 15 Control 2 + I-1a 41.6% Catapal ™ in water (No PVA) | 34.6 | 54.5 |
| Example 16 Control 2 + I-5a (dilution 22:4 poly-NIPAM:polyacrylamide (No PVA) | 51.8 | 28.0 |

TABLE 1-continued

Rheological Properties of Dispersants of the Invention in Control Dispersions

| Example | $T^{Trans}$ ° C. | $\Delta G^*_{Trans}/$ Pa · ° C.$^{-1}$ |
|---|---|---|
| Example 18 Control 3 + I-1a | 35.4 | 113.8 |
| Example 21 Control 4 + I-19a | 46.5 | 782 |

(NB. Examples where there is no thermal transition are not included).

TABLE 2

Rheological Properties of the Control 4 Dispersion in Absence and Presence of Dispersants

| Example | G*(20° C. hold)/Pa | G*(60° C. hold)/Pa |
|---|---|---|
| 19 (Control 4) | 79 | 141 |
| 20 (Control 4 + C3) | 0.083 | 0.045 |
| 21 (Control 4 + I-19a) | 5.4 | 12319 |

Example 22

Image Quality of Inkjet Print on Media Prepared Using Dispersant I-1a

The objective of this example was to show that inkjet media prepared using a thermally-responsive dispersant of this invention would have improved ink uptake. Superior image quality would thereby result from the avoidance of ink being retained on the surface of the media and then subsequently drying with uneven distribution of colorant. This effect is often referred to as coalescence or mottle.

In a control experiment, alumina (Catapal™ 200, 805.0 g) was sheared into water (1495.0 g) to give a 35% suspension. PVA (Gohsenol™ GH23, 70.0 g) was diluted with water (630.0 g) to give a 10% solution. The two were mixed together with a non-ionic surfactant (Olin™ 10G, 10% in water, 4.7 g), a cross-linking agent (2,3-dihyroxy-1,4-dioxane, 10% in water, 3.4 g) and boric acid (5% in water, 3.5 g). The resulting 27% dispersion of alumina was bead-coated at 0.28 g·m$^2$ on to corona discharge treated resin-coated paper at 3.66 m·min$^{-1}$. In a second experiment, comparison dispersant C5 (2% by weight, 2.47 g) was added to the formulation and the dispersion was coated as before. In a third experiment, the dispersion was coated instead in the presence of thermally-responsive dispersant I-1a (2% by weight, 2.47 g). All coatings were dried using forced air.

The image quality that could be achieved using these coatings was assessed by printing a standard test format on an Epson™ R320 inkjet printer using the manufacturer's recommended inks. The image quality of the green record of the test print was improved by the addition of I-1a, in that the image was more uniform in density. The results are shown in TABLE 3.

TABLE 3

Image Quality in Green Record of Epsom™ R320 Test Prints in Absence and Presence of Dispersants

| Additional Dispersant | Visual Assessment of Image Quality | Image of Green Record |
|---|---|---|
| None (control) | Poor | ■ |
| C5 | Poor | ■ |
| I-1a | Good | ■ |

The invention claimed is:

1. A method of coating a substrate comprising the steps of
   (a) providing a composition of positively- or negatively-charged or chargeable solid or liquid particulates;
   (b) combining the composition with one or more thermally-responsive dispersants in association with an aqueous dispersing medium, and optionally a binder, to form a coating composition containing an aqueous dispersion comprising the positively- or negatively-charged or chargeable solid or liquid particulates and the thermally-responsive dispersant, wherein the thermally responsive dispersant comprises a compound having an anchoring moiety linked to at least one thermally-responsive polymeric stabilizing moiety, other than a polyalkylene oxide, the at least one polymeric moiety having a lower affinity for the surface than the anchoring group below the thermal transition temperature, the particulates being positively- charged or chargeable when the anchoring moiety contains at least one acid and/or hydroxy group and has a net acidity or neutrality and the particulates being negatively- charged or chargeable when the anchoring moiety has at least one basic group and has a net basicity, wherein the dispersion exhibits a change in sign from negative to positive and an increase in magnitude of a rheological property, the property being viscosity at low shear and/or complex modulus at low amplitude oscillatory shear, on increasing the temperature from below to above the thermal transition temperature;
   (c) applying the coating composition to the substrate at a temperature below the thermal transition temperature of the dispersant to form a fluid coating thereon; and
   (d) drying the resultant coating at a temperature above the transition temperature of the dispersant by the application of heat.

2. A method according to claim 1 wherein the particulates are positively- charged or chargeable, and the at least one acid group is selected from a carboxylic acid, sulfonic acid or phosphoric acid group.

3. A method according to claim 1 wherein the particulates are negatively- charged or chargeable, and each basic group is independently selected from an unsubstituted or substituted amine, nitrogen-containing heterocycle, which may contain one or more other heterocyclic atoms selected from nitrogen, oxygen and sulfur, or the hydroxide of a quaternary ammonium or pyridinium salt.

4. A method according to claim 1 wherein the thermally-responsive polymeric moiety is selected from poly-N-alkylacrylamides where the alkyl group contains 2 to 6 carbon atoms, copolymers of N-alkylacrylarnides, poly-NIPAM-co-acrylic acid, polyhydroxypropylcellulose, poly-(N-vinylcaprolactam) and its homologues and a polyvinylmethylether.

5. A method according to claim 1 wherein a non-thermally responsive monomer is included in the thermally-responsive dispersant selected from acrylamide, N,N-di-methylacrylamide, 2-acrylamido -2-hydroxymethyl-1,3-propandiol, methacrylamide, N-methylacrylamide or N-methylmethacrylamide or a mixture thereof or a polyalkylene oxide.

6. A method according to claim 3 wherein a non-thermally responsive monomer is included in the thermally-responsive dispersant selected from acrylamide, methacrylamide, N-methylacrylamide or N-methylmethacrylamide or a mixture thereof.

7. A method according to claim 1 wherein the thermally-responsive dispersant is of having the formula (I):

wherein
R is an anchor group;
L is a linking group and z is 0 or 1;
each M is a monomer unit, which may be the same or different, at least one of which monomer unit is thermally-responsive such that $[M]_w$ has a net thermal-responsivity, and w is 5-200; and
F is hydrogen or a substituent.

8. A method according to claim 7 wherein the thermally-responsive dispersant has a formula selected from

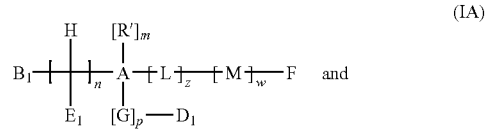

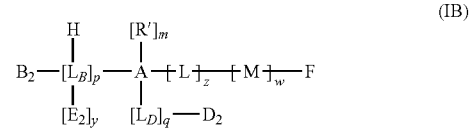

wherein
A is carbon or nitrogen;
R' is hydrogen or an unsubstituted or substituted alkyl, aryl or heterocyclic group and m is 1 when A is carbon and m is 0 when A is nitrogen; and in structure (IA):
$D_1$ is a hydrogen atom, an unsubstituted or substituted amino group, an acid group or an ester or amide thereof, an unsubstituted or substituted alkyl group (including an alkyl group substituted with one or more acid groups or an ester or amide thereof);
G is a carbonyl group or an unsubstituted or substituted alkylene, aminoalkylene or oxyalkylene group and p is 0 or 1;
each $E_1$ is independently hydrogen, an unsubstituted or substituted amino group or an acid group or an ester or amide thereof and n is 0 or an integer from 1 to 10;
$B_1$ is an acid group or an ester or amide thereof, or a hydroxy group;

$D_1$ and L or $D_1$, G and L may combine with A to form an unsubstituted or substituted 5-, 6- or 7- membered ring which may include one or more further heteroatoms selected from nitrogen, oxygen and sulfur;

with the proviso that (i) the number of acid groups in the anchoring group is equal to or greater than the number of amino groups therein and (ii) there is at least one hydroxy or acid group in the anchoring group;

and in structure (IB):

$D_2$ and each $E_2$ is independently hydrogen, unsubstituted or substituted alkyl or a basic group; or an acid group or an ester or amide thereof and y is 0 or 1;

$L_B$ and $L_D$ are linking groups, which are the same or different, and p and q are each independently 0 or 1;

$B_2$ is a basic group; and $B_2$, $L_B$, D, $L_D$ and L may combine with A to form more one or more rings which may include one or more further heteroatoms selected from nitrogen, oxygen and sulphur, with the proviso that the number of basic groups in the anchoring group is greater than the number of any acid groups therein.

9. A method according to claim 7 wherein M is N-vinylcaprolactam or N-isopropylacrylamide.

10. A method according to claim 7 wherein the number of monomeric units w is 10 to 50.

11. A method according to claim 2 wherein the thermally-responsive dispersant has a structure selected from

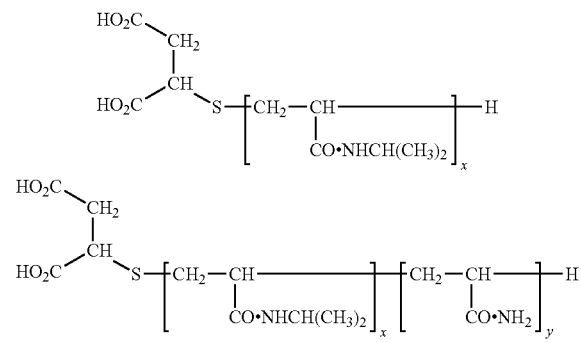

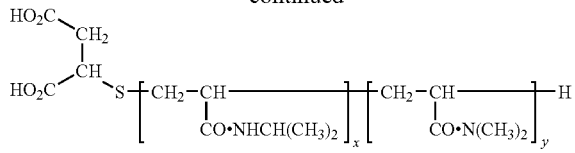

and

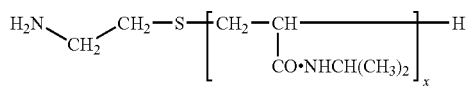

where x is from 10 to 25 and y is from 4 to 10.

12. A method according to claim 4, wherein the thermally-responsive dispersant has the structure wherein x is 12.

13. A method according to claim 1 wherein the particulates are or can be positively-charged and are selected from metal oxides, metal hydroxides, metal carbonates, nitrides, ceramics and metals and positively- charged or chargeable latexes, all at a pH below their isoelectric point.

14. A method according to claim 1 wherein the particulates are or can be negatively-charged and are selected from metallic and non-metallic oxides/hydroxides, ceramics and metals and negatively- charged or chargeable latexes, all at a pH above their isoelectric point.

15. A method according to claim 1 wherein the positively- or negatively- charged or chargeable particulates have a particle size from 50 nm to 1 micrometer.

16. A method according to claim 1 wherein the positively- or negatively- charged or chargeable solid particulate content in the dispersion is a volume fraction of solids of about 0.15 to about 0.4.

17. A method according to claim 1 wherein the dispersant content for positively- charged or chargeable particulates is 7:1000 to 16:1000 w/w particulate, and the dispersant content for negatively-charged or chargeable particulates is 50:1000 to 500:1000 w/w particulate.

\* \* \* \* \*